US010468992B2

(12) United States Patent
Tanaka et al.

(10) Patent No.: US 10,468,992 B2
(45) Date of Patent: Nov. 5, 2019

(54) AUXILIARY POWER SUPPLY DEVICE FOR ELECTRIC ROLLING STOCK

(71) Applicant: Mitsubishi Electric Corporation, Chiyoda-ku, Tokyo (JP)

(72) Inventors: Takeshi Tanaka, Tokyo (JP); Takeshi Yamamoto, Tokyo (JP); Naoki Kuraba, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 408 days.

(21) Appl. No.: 15/516,788

(22) PCT Filed: Oct. 22, 2014

(86) PCT No.: PCT/JP2014/078086
§ 371 (c)(1),
(2) Date: Apr. 4, 2017

(87) PCT Pub. No.: WO2016/063378
PCT Pub. Date: Apr. 28, 2016

(65) Prior Publication Data
US 2017/0302188 A1    Oct. 19, 2017

(51) Int. Cl.
*H05K 9/00*    (2006.01)
*H02M 3/335*    (2006.01)
(Continued)

(52) U.S. Cl.
CPC .......... *H02M 3/33569* (2013.01); *B60L 1/00* (2013.01); *B60L 3/003* (2013.01); *B60L 13/00* (2013.01);
(Continued)

(58) Field of Classification Search
CPC .. B60L 1/00; B60L 13/00; B60L 3/003; B60L 2200/26; B60L 2210/10;
(Continued)

(56) References Cited

U.S. PATENT DOCUMENTS

2001/0012207 A1*  8/2001  Nomura ............ H02M 3/33569
                                                                363/17
2012/0300501 A1*  11/2012  Kojima ............ H02M 3/33576
                                                                363/17
(Continued)

FOREIGN PATENT DOCUMENTS

JP    3-280389 A    12/1991
JP    5-111245 A    4/1993
(Continued)

OTHER PUBLICATIONS

Office Action dated Apr. 30, 2019, by the India Patent Office in corresponding India Patent Application No. 201747012207. (5 pages).
(Continued)

Primary Examiner — Rexford N Barnie
Assistant Examiner — Toan T Vu
(74) Attorney, Agent, or Firm — Buchanan Ingersoll & Rooney PC

(57) ABSTRACT

An auxiliary power supply device includes: a resonance-type inverter circuit to convert DC power input from a DC power supply to AC power, a primary coil for input of AC power from the inverter circuit, a transformer for output of AC power from a secondary coil insulated from the primary coil, a converter circuit for conversion of AC power from the transformer to DC power, a filter condenser for smoothing of DC voltage from the converter circuit, and an inverter controller for output of a gate signal for causing operation of switching elements of the inverter circuit. The inverter
(Continued)

controller, in a charging mode for charging the filter condenser, makes pulse width of the gate signal smaller than when in a running mode for running of electric rolling stock, and gradually increases the pulse width in accordance with an elapsed time under control in the charging mode.

9 Claims, 17 Drawing Sheets

(51) Int. Cl.
| | | |
|---|---|---|
| *B60L 1/00* | (2006.01) | |
| *B60L 3/00* | (2019.01) | |
| *B60L 13/00* | (2006.01) | |
| *H02M 1/08* | (2006.01) | |
| *H02M 7/537* | (2006.01) | |
| *H02M 3/337* | (2006.01) | |
| *H02M 7/48* | (2007.01) | |

(52) U.S. Cl.
CPC ............. *H02M 1/08* (2013.01); *H02M 7/537* (2013.01); *B60L 2200/26* (2013.01); *B60L 2210/10* (2013.01); *B60L 2210/20* (2013.01); *B60L 2210/40* (2013.01); *H02M 3/337* (2013.01); *H02M 2007/4815* (2013.01); *Y02T 10/725* (2013.01); *Y02T 10/7216* (2013.01); *Y02T 10/7241* (2013.01)

(58) Field of Classification Search
CPC .. B60L 2210/20; B60L 2210/40; H02M 1/08; H02M 3/33569; H02M 7/537; H02M 2007/4815; H02M 3/337; Y02T 10/7216; Y02T 10/7241; Y02T 10/725
USPC .......................................................... 307/91
See application file for complete search history.

(56) References Cited

U.S. PATENT DOCUMENTS

| | | | |
|---|---|---|---|
| 2014/0111128 A1 | 4/2014 | Hensel et al. | |
| 2014/0312810 A1 | 10/2014 | Toda et al. | |
| 2015/0381064 A1* | 12/2015 | Matsubara | H02M 3/33584 363/17 |
| 2016/0126750 A1* | 5/2016 | Yasuda | H02J 7/0042 307/104 |

FOREIGN PATENT DOCUMENTS

| | | |
|---|---|---|
| JP | 11-215841 A | 8/1999 |
| JP | 2000-270546 A | 9/2000 |
| JP | 2002-291245 A | 10/2002 |
| JP | 2002-369308 A | 12/2002 |
| JP | 2006-115596 A | 4/2006 |
| JP | 2014-087255 A | 5/2014 |
| WO | WO 2013/102960 A1 | 7/2013 |

OTHER PUBLICATIONS

International Search Report (PCT/ISA/210) dated Jan. 27, 2015, by the Japanese Patent Office as the International Searching Authority for International Application No. PCT/JP2014/078086.
Written Opinion (PCT/ISA/237) dated Jan. 27, 2015, by the Japanese Patent Office as the International Searching Authority for International Application No. PCT/JP2014/078086.
Japanese Office Action (Notification of Reasons for Rejection) dated Jan. 17, 2017, issued in the corresponding Japanese Patent Application No. 2016-555004. (8 pages) (partial English translation).

* cited by examiner

AUXILIARY POWER SUPPLY DEVICE FOR ELECTRIC ROLLING STOCK

TECHNICAL FIELD

The present disclosure relates to an auxiliary power supply device for electric rolling stock.

BACKGROUND ART

An auxiliary power supply device for electric rolling stock is generally equipped with an inverter circuit for conversion of power acquired from a pantograph to AC power, a transformer for transforming voltage output from the inverter circuit, a converter circuit for conversion of the AC power output from the transformer to DC power for supply to a load, and a filter condenser for smoothing DC voltage of output from the converter circuit.

The filter condenser of the auxiliary power supply device may be discharged during maintenance, stoppage and the like of the electric rolling stock so that the filter condenser is not electrically charged at the start of running of the electric rolling stock. Under such circumstances, the filter condenser of the auxiliary power supply device is typically charged prior to the start of running.

When, during charging of the filter condenser by an auxiliary power supply device, the inverter circuit is operated in the same manner as during running of the electric rolling stock, current flowing in switching elements included in the inverter circuit is greater than the current during running of the electric rolling stock. In particular, during the time period when the amount of stored electricity of the filter condenser is nearly zero, the current in the switching elements of the inverter circuit is extremely high in comparison to when the electric rolling stock is running.

For example, Patent Literature 1 discloses technology for, during charging of the filter condenser, control of switching frequency of the switching elements by a comparison between a predetermined value of duty ratio and a triangular wave of a predetermined frequency.

The technology disclosed in Patent Literature 1 may be applied to the charging of the filter condenser of the auxiliary power supply device. For example, control can be considered so that current for charging is output from the inverter circuit in a time period T1 during which the triangular wave is less than a threshold (duty ratio), and the inverter circuit does not output current for charging during a time period T2 during which the triangular wave is greater than or equal to the threshold.

As a specific example, if the period of the triangular wave is set to 100 microseconds, and if a threshold is adopted such that the time period T1 is 3 microseconds, the time period T2 is 97 microseconds. The current output from the inverter circuit is generally a sinusoidal wave of the same period as the triangular wave, and thus if the time period T1 is 3 microseconds, the current output from the inverter circuit is cut off for a comparatively short time period. Then upon passage of 97 microseconds after blocking of the output of current, the inverter circuit again outputs current for just 3 microseconds. During the time period of charging the filter condenser of the auxiliary power supply device, such configuration enables prevention of high current flowing in the elements included in inverter circuit.

CITATION LIST

Patent Literature

Patent Literature 1: International Publication No. WO 2013/102960

SUMMARY OF INVENTION

Technical Problem

However, in practice the accurate control of the time period T1 of output of the current from the inverter circuit at the extremely short time period of 3 microseconds is difficult.

Generally during the time period of output of a gate signal from a gate drive board, the switching elements included in the inverter circuit are turned ON, and the inverter circuit outputs current in the time period during which the switching elements are turned ON. Due to factors such as variance in the manufacturing process of the gate drive board, variance may occur in the output time period of the gate signal, and the time period T1 may deviate from the time period used for design. Moreover, a certain amount of variance in performance of the switching elements themselves occurs in the manufacturing process generally. Thus as a result of the operation of the switching elements being delayed relative to the switching signal, the time period T1 may deviate from the designed time period.

For example, even though the time period T1 for output of current from the inverter circuit is 3 microseconds by design, current actually flows from the inverter circuit as output for 4 microseconds due to the aforementioned factors. The current output from the inverter circuit, in the aforementioned manner, generally has a sinusoidal waveform of the same period as the triangular wave. Thus the current from the inverter circuit after 4 microseconds is larger than the current after 3 microseconds. The current output 4 microseconds after the start of output of current by the inverter circuit can be an overcurrent for the switching elements of the inverter circuit.

Even if, for example, the time period T1 of output of current from the inverter circuit can be accurately controlled, a high current can flow in the switching elements of the inverter circuit as a result of variance in the inductances of each of the circuits of the auxiliary power supply device. During the manufacturing process, generally variance occurs in of the auxiliary power supply device in floating impedances, transformer leakage inductances and the like of the circuits included in the inverter circuit and the like. Size of the current output from the inverter circuit regularly changes as a result of factors such as floating impedances and leakage impedances. Thus as a result of variances in the inductances of each of the circuits of the auxiliary power supply device, the current flowing in the switching elements of the inverter circuit may be larger than the design value current. The current larger than the design value current can result in overcurrent in the switching elements of the inverter circuit.

Further, resonance-type inverters are widely used in order to decrease losses associated with high speed switching operation in inverters of auxiliary power supply devices. In order to perform switching at times in which the current is zero due to resonance, the resonance-type inverter is usually designed such that the period of the triangular wave matches the period of resonance. However, if the technology disclosed in Patent Literature 1 is used for charging the filter condenser of the auxiliary power supply device, the inverter circuit stops output of current at times other than the times when the current is zero due to resonance. Thus losses associated with switching operation become high, and such high losses can cause over heating of the switching elements.

Repeated flow of overcurrent in the switching elements in the aforementioned manner or continued overcurrent in the switching elements can cause damage to the switching elements.

In order to solve the aforementioned problem, the objective of the present disclosure is to provide an auxiliary power supply device for which damage to the switching elements during charging of the filter condenser can be suppressed.

Solution to Problem

In order to attain the aforementioned objective, an auxiliary power supply device for electric rolling stock includes: a resonance-type inverter circuit to convert a DC power input from a DC power supply to a AC power; a transformer comprising a primary coil to input the AC power from the inverter circuit and a secondary coil, insulated from the primary coil, to output a AC power; a converter circuit to convert the AC power output from the transformer to a DC power; a filter condenser to smooth a DC voltage output from the converter circuit; and a controller to output a gate signal to operate a switching element of the inverter circuit or the converter circuit. Further, the controller sets a pulse width of the gate signal under a charging mode to be smaller than under a running mode, and gradually increases the pulse width with an elapsed time under control in the charging mode. The charging mode is used for control of charging of the filter condenser, and the running mode is used for control of running of the electric rolling stock.

Advantageous Effects of Invention

In the present disclosure, the controller, when in the charging mode, decreases the pulse width of the gate signal for operation of switching elements relative to operation in the running mode. By this means, the time of output of current from the inverter circuit or the converter circuit becomes smaller than the time under the running mode, and thus the output of current can be cut off prior to the current flowing in the switching elements becoming large. Such operation enables prevention of high current flow in the switching elements during charging of the filter condenser.

Further, when there is a high probability of the flow of a particularly high current in the switching elements during a time period when the amount of stored electricity in the filter condenser is small, in the charging mode the controller gradually increases the pulse width of the gate signal for causing operation of the switching elements. Thus the time period of output of current from the inverter circuit or converter circuit becomes gradually longer in accordance with the increase in the amount of stored electricity in the filter condenser. While the amount of stored electricity in the filter condenser is low, such operation enables lowering of the current flowing in the switching elements.

Such operation thus makes possible suppression of damage to the switching elements during charging of the filter condenser.

DESCRIPTION OF EMBODIMENTS

Embodiments of the present disclosure are described below in reference to figures. In all the figures, the same reference signs are assigned to components that are the same.

Embodiment 1

Figure 1:
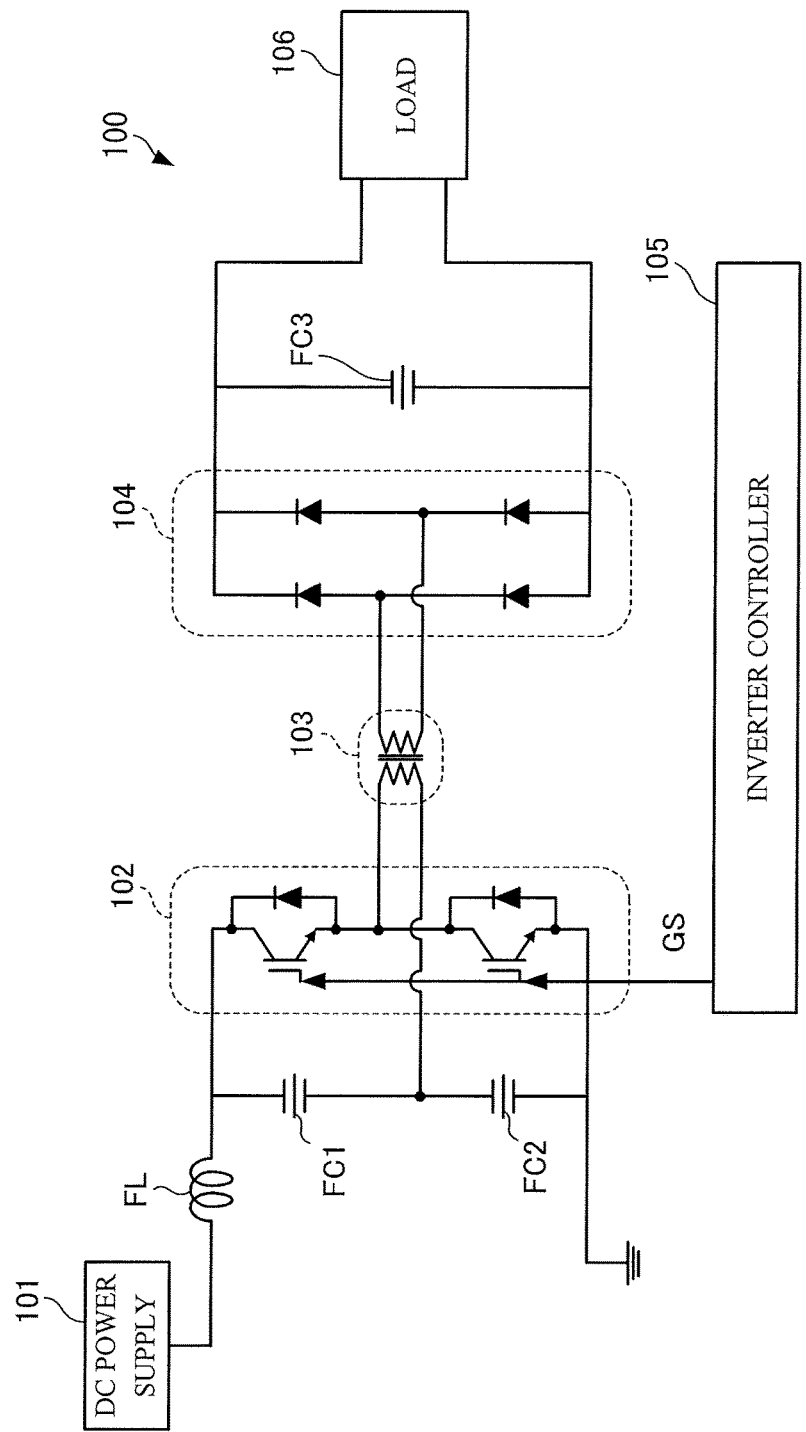
FIG. 1 is a drawing illustrating configuration of an auxiliary power supply device for electric rolling stock of Embodiment 1 of the present disclosure.

As illustrated in FIG. 1, an auxiliary power supply device for electric rolling stock (referred to hereinafter sometimes simply as the "auxiliary power supply device") 100 of Embodiment 1 of the present disclosure includes: an inverter circuit 102 to convert a DC power input from a DC power supply 101 to an AC power; a transformer 103 having a primary coil to input power from the inverter circuit 102 and a secondary coil, insulated from the primary coil, to output an AC power; a converter circuit 104 to convert the AC power output from the transformer 103 to a DC power; a filter condenser FC3 to smooth a DC voltage output from the converter circuit 104; and an inverter controller 105 to output a gate signal GS to causing operation of switching elements of the inverter circuit 102.

As illustrated in the figure, the inverter circuit 102 includes two switching elements, such as insulated gate bipolar transistors (IGBTs), and diodes connected in reverse-parallel to each of the switching elements. Between the inverter circuit 102 and the DC power supply 101, two filter condensers FC1 and FC2, which are connected in parallel to the inverter circuit 102, are connected to a filter reactor FL, which is connected in series to the inverter circuit 102. The filter reactor FL and the filter condensers FC1 and FC2 are included in a resonant circuit. A resonance-type inverter circuit is formed by connection of the filter reactor FL, the filter condensers FC1 and FC2 and the inverter circuit 102.

The resonance frequency of this resonant circuit, that is, the resonance frequency of the resonance-type inverter circuit 102, for example, may be set appropriately during design of the resonant circuit, and is taken to 10 kHz in the present embodiment. That is to say, the frequency of resonance of the resonance-type inverter circuit 102 (resonant circuit) in the present embodiment is 100 microseconds.

The main objective of the transformer 103 is insulation of the circuit contacting the primary coil from the circuit contacting the secondary coil, and the transformer 103 has, for example, a voltage transformation ratio of 1:1.

The primary coil of the transformer 103 interconnects a node between the inverter circuit 102 IGBT and diode sets, and a node between the filter condensers FC1 and FC2. The secondary coil of the transformer 103 is connected to the converter circuit 104.

The primary coil couples through mutual inductance with the secondary coil, and AC current flows in the secondary coil in association with the change in AC current flowing in the primary coil. The transformer 103 outputs the current flowing in the secondary coil.

Further, the voltage transformation ratio of the transformer 103 is not limited to 1:1 and may be appropriately varied.

The converter circuit 104 includes four rectifying diodes. In particular, two rectifying diode groups are connected in parallel, each group being formed by two rectifying diodes connected in series. The secondary coil of the transformer 103 is connected between each of the groups of rectifying diodes, and thus the power voltage-converted by the transformer 103 is input to the converter circuit 104.

DC power output from the converter circuit 104 is consumed by the filter condenser FC3 in a charging mode, and is consumed by a load 106 in a running mode. Examples of the load 106 include air conditioners, lighting equipment and the like installed within the electric rolling stock.

The filter condenser FC3 is approximately fully charged during running of the electric rolling stock, and thus a voltage VFc between the filter condenser electrodes is maintained at roughly the rated voltage of the filter condenser FC3. In contrast, in circumstances such as when the electric rolling stock first begins to run, or when the electric rolling stock after maintenance leaves the maintenance shop, the filter condenser FC3 is not fully charged, and thus the voltage VFc between the filter condenser electrodes is smaller than the rated voltage.

The inverter controller 105 outputs a gate signal GS that is a pulse signal for input to the gate terminals of each of the switching elements of the inverter circuit 102. When the gate signal GS is input to the gate terminals, each of the switching elements of the inverter circuit 102 turns ON to allow passage of current. When input of the gate signal GS to the gate terminal is interrupted, each of the switching elements of the inverter circuit 102 turns OFF to block passage of current. Thus the inverter controller 105 performs as a controller for controlling the inverter circuit 102.

In particular, during running of the electric rolling stock, the inverter controller 105 controls the inverter circuit 102 by a control method that differs from the control method used during charging of the filter condenser FC3. Hereinafter, the control method used during running of the electric rolling stock is referred to as the "running mode", and the control method used during charging of the filter condenser FC3 is referred to as the "charging mode".

In the running mode, the inverter controller 105 outputs alternatingly to each of the switching elements of the inverter circuit 102 a gate signal GS of fixed pulse interval and fixed pulse width.

Thus during operation in the running mode the inverter controller 105 controls the inverter circuit 102 such that the inverter circuit 102 outputs fixed-period AC current. That is to say, the switching elements of the inverter circuit 102 are alternatingly turned ON and OFF in accordance with the gate signal GS input to each of the gate terminals, and thus the inverter circuit 102 outputs fixed-period AC current.

In the charging mode, the inverter controller 105 makes the pulse width of the gate signal GS smaller than that of the running mode, and gradually increases pulse width of the gate signal GS depending on the elapsed time under control in the charging mode. Thus during operation in the charging mode, the inverter controller 105 controls the inverter circuit 102 such that current (charging current Ich) output from the inverter circuit 102 becomes extremely small in the initial period of charging the filter condenser FC3, and becomes gradually larger in association with the charging the filter condenser FC3. Here, the charging current Ich is the current output from the inverter circuit 102 during the charging of the filter condenser FC3.

The inverter controller 105 of the present embodiment is operated in the charging mode until a charging time Tch has elapsed since the start of operation of the inverter controller 105, and operates in the running mode on and after the charging time Tch. The charging time Tch is determined beforehand as the time period for operation of the inverter controller 105 in the charging mode. The charging time Tch, for example, is longer than the time necessary for fully charging the filter condenser FC3.

Figure 2:
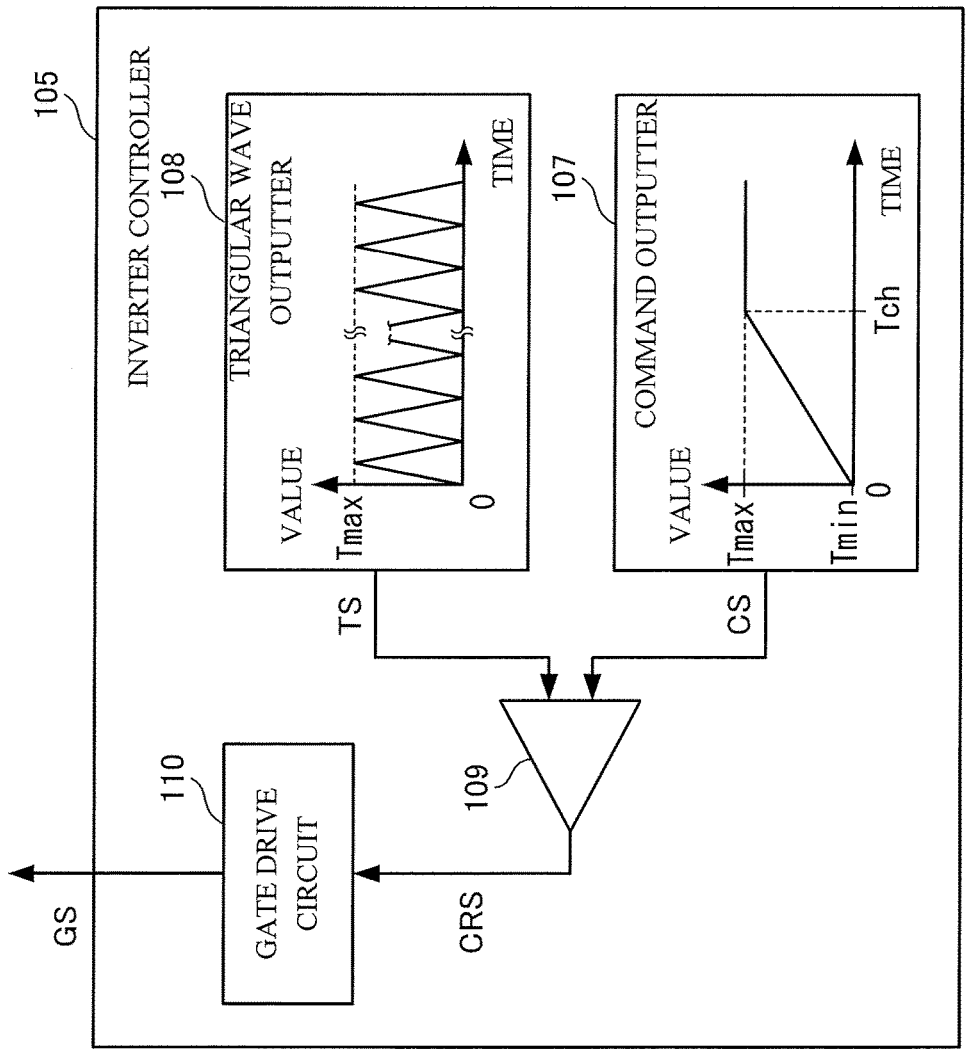
FIG. 2 is a drawing illustrating configuration of an inverter controller of Embodiment 1.

In order to realize such control, as illustrated in FIG. 2, the inverter controller 105 of the present embodiment includes: a command outputter 107 to output, in accordance with each of the charging mode and running mode, a predetermined command signal CS; a triangular wave outputter 108 to output a triangular wave signal TS in accordance with a predetermined triangular wave; a comparator 109 to compare the values included in each of the command signal CS and the triangular wave signal TS, and to output a comparison result signal CRS on the basis of the comparison; and a gate drive circuit 110 to output the gate signal GS on the basis of the comparison result signal CRS.

The command outputter 107 holds beforehand command information indicating a relationship between a value and the elapsed time since the start of operation of the inverter controller 105, and outputs the command signal CS in accordance with the command information.

The command information of the present embodiment, as illustrated in FIG. 2, indicates a ramp function. That is to say, the command information of the present embodiment indicates a value that increases linearly from a minimum value Tmin until a maximum value Tmax during the time period until the charging time Tch after the start of operation of the inverter controller 105. Moreover, the command information of the present embodiment, on and after the charging time Tch, indicates a fixed value.

The command information held by the command outputter 107 specifies the value corresponding to the elapsed time after the start of operation of the inverter controller 105. Further, the command outputter 107 outputs the command signal CS, which includes the specified value.

That is to say, the command outputter 107 of the present embodiment corresponds to a command outputter that outputs a first command signal indicating a gradually higher value depending on the elapsed time under control in the charging mode, and a second command signal indicating a fixed value under the running mode. Further, with the passage of time under control in the charging mode from the minimum value Tmin until the maximum value Tmax, the value indicated by the command information, for example, may increase in a smoothly curved manner, or may increase in a step-wise manner.

Here, the minimum value Tmin is a value indicated by the command signal CS (first command signal) output at the start time of operation of the inverter controller 105 in the charging mode, and this value is zero in the present embodiment. The maximum value Tmax is a value indicated by the command signal CS (second command signal) output during the time period of operation of the inverter controller 105 in the running mode, and this value may be set appropriately, for example, as 1, 100, and the like.

The triangular wave outputter 108 holds beforehand triangular wave information that indicates the relationship between a value and the elapsed time after the start of operation of the inverter controller 105, and the triangular wave outputter 108 outputs the triangular wave signal TS in accordance with the triangular wave information.

The triangular wave information in the present embodiment, as illustrated in FIG. 2, indicates increasing and decreasing values as a repeating triangular wave depending on the elapsed time after the start of operation of the inverter controller 105. In particular, the triangular wave is a repeating waveform that decreases linearly to zero after linearly increasing from zero to the maximum value Tmax, and the time of increase from zero until the maximum value Tmax is equal to the time of decrease from the maximum value Tmax until zero.

Using the triangular wave information held by the triangular wave outputter 108, the triangular wave outputter 108 specifies the value corresponding to the elapsed time after the start of operation of the inverter controller 105. Further, the triangular wave outputter 108 outputs the triangular wave signal TS that includes the specified value.

That is to say, the triangular wave outputter 108 of the present embodiment, in both the charging mode and the running mode, corresponds to the triangular wave outputter to output of the first triangular wave signal indicating the value in accordance with the predetermined first triangular wave.

Here, the period of the triangular wave indicated by the triangular wave information held by the triangular wave outputter 108 is taken to be 100 microseconds (that is, 10 kHz frequency), which is the same as the period of resonance of the inverter circuit 102. Thus during running of the electric rolling stock, the switching elements of the inverter circuit 102 can be switched ON and OFF with the same period as the period of the resonance of the inverter circuit 102. Such operation of the switching elements enables a reduction in power loss. Further, the period of the triangular wave indicated by the triangular wave information held by the triangular wave outputter 108 is not limited, and may be appropriately determined.

The comparator 109 acquires the command signal CS from the command outputter 107, and acquires the triangular wave signal TS from the triangular wave outputter 108. The comparator 109 compares the values included in each of the acquired command signal CS and triangular wave signal TS. If the value indicated by the triangular wave signal TS is smaller than the value indicated by the command signal CS, the comparator 109 outputs the comparison result signal CRS. If the value indicated by the triangular wave signal TS is greater than or equal to the value indicated by the command signal CS, the comparator 109 does not output the comparison result signal CRS.

The gate drive circuit 110 outputs the gate signal GS during the acquiring of the comparison result signal CRS from the comparator 109. At this time, if the comparison result signal CRS from the comparator 109 stops, the output destination of the gate signal GS is switched between the switching elements by the gate drive circuit 110.

That is to say, in both the charging mode and the running mode, the gate drive circuit 110 of the present embodiment corresponds to the gate drive circuit for output of the gate signal GS during the time period when the value indicated by the first triangular wave signal is smaller than the value indicated by the first command signal.

Further, the comparator 109, on the basis of the result of the comparison, may output the comparison result signal CRS indicating that the value indicated by the triangular wave signal TS is smaller than the value indicated by the command signal CS, or indicating that the value indicated by the triangular wave signal TS is greater than or equal to the value indicated by the command signal CS. Further, the gate drive circuit 110 may output the gate signal GS when, as indicated by the comparison result signal CRS, the value indicated by the triangular wave signal TS is smaller than the value indicated by the command signal CS.

The configuration of the auxiliary power supply device 100 of Embodiment 1 is described above. Operation of the auxiliary power supply device 100 is described hereinafter.

(Operation in Charging Mode)

In circumstances such as when the electric rolling stock initially begins to run, or when the electric rolling stock after maintenance leaves the maintenance shop, the inverter controller 105 operates in the charging mode. Voltage VFc of the filter condenser FC3 at the start of charging of the filter condenser FC3 is taken to be zero.

Upon the start of operation in the charging mode, the command outputter 107 outputs the triangular wave signal TS, which includes a value corresponding to the elapsed time of control operation in the charging mode; and the triangular wave outputter 108 outputs the command signal CS, which includes a value corresponding to the elapsed time of control operation in the charging mode. Here, the relationships between time under control in the charging mode, and the values of each of the triangular wave signal TS and the command signal CS, are illustrated in FIG. 3(a). The time under control in the charging mode is indicated by the horizontal axis of FIG. 3(a), and the values of the triangular wave signal TS and the command signal CS are indicated by the vertical axis.

The comparator 109 compares the triangular wave signal TS and the command signal CS and then outputs the comparison result signal CRS. The gate drive circuit 110 outputs the gate signal GS on the basis of the comparison result signal CRS.

In the aforementioned manner, the comparator 109 outputs the comparison result signal CRS when the value indicated by the triangular wave signal TS is smaller than the value indicated by the command signal CS, and does not output the comparison result signal CRS when the value indicated by the triangular wave signal TS is greater than or equal to the value indicated by the command signal CS. The gate drive circuit 110 outputs the gate signal GS during the time period in which the comparison result signal CRS is acquired from the comparator 109.

Figure 3:
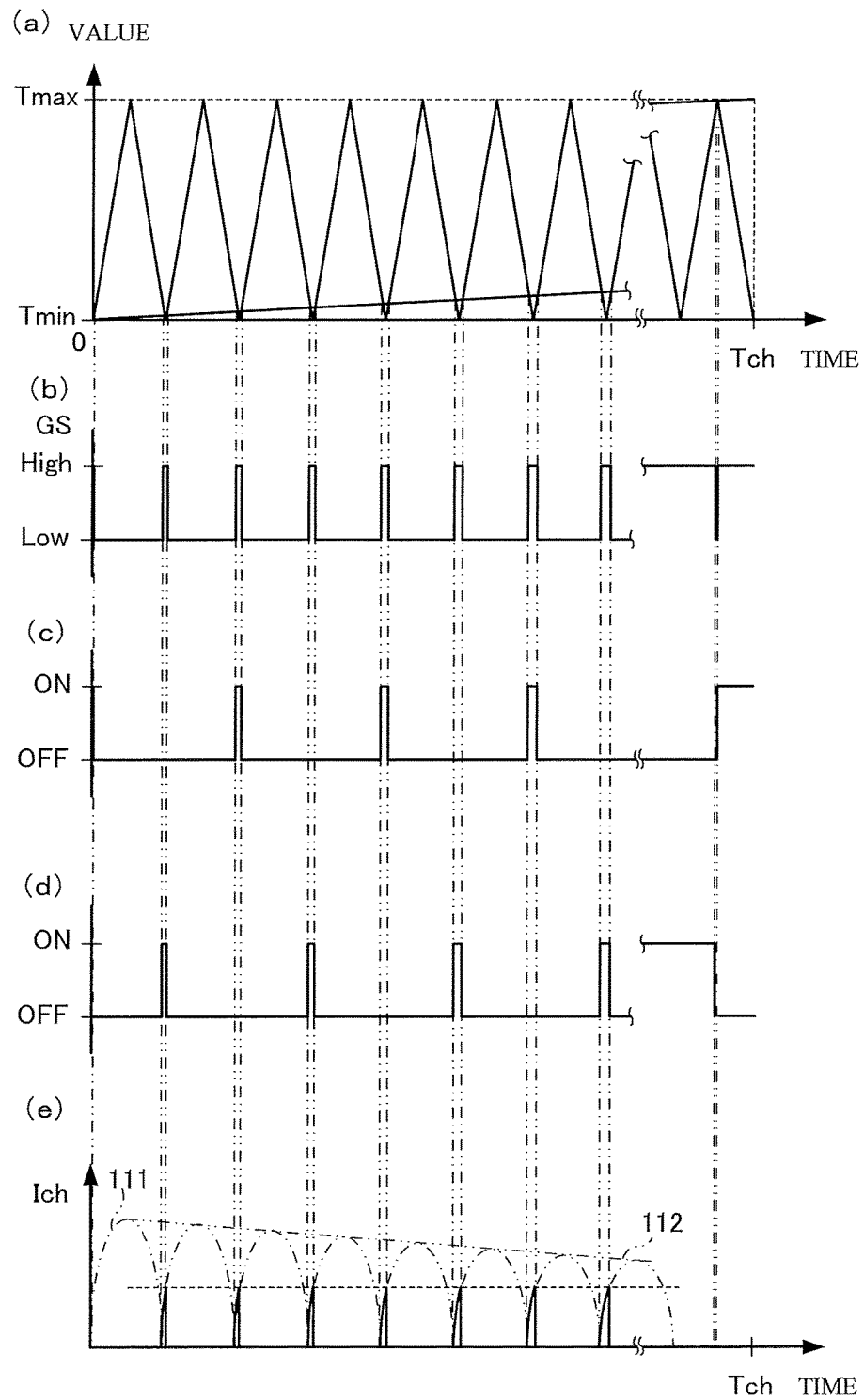
FIG. 3 is a graph illustrating gate signals output based on operation of the inverter controller of Embodiment 1 in a charging mode.

Thus when the command signal CS and the triangular wave signal TS including the values illustrated in FIG. 3(*a*) are output from the command outputter 107 and the triangular wave outputter 108, respectively, the gate signal GS illustrated in FIG. 3(*b*) is output from the gate drive circuit 110. Time under control in the charging mode is indicated by the horizontal axis of FIG. 3(*b*), and output (High) or non-output (Low) of the gate signal GS is indicated by the vertical axis of FIG. 3(*b*).

As illustrated in of FIG. 3(*b*), pulse width of the gate signal GS output from the inverter controller 105 of the present embodiment gradually becomes larger with the passage of time under control in the charging mode. Further, pulse width of the gate signal GS in the charging mode is smaller than the pulse width of the gate signal GS in the below-described running mode (see FIG. 4(*b*)).

Each of the switching elements of the inverter circuit 102 turns ON (conductive) when the gate signal GS is input, and turns OFF (cut off) when the gate signal GS input is cut off. Further, when the comparison result signal CRS from the comparator 109 is interrupted, the gate drive circuit 110 changes which switching element is the output destination of the gate signal GS.

Thus one of the switching elements of the inverter circuit 102 is operated to switch between ON and OFF as illustrated in FIG. 3(*c*). Further, the other switching element of the inverter circuit 102 is operated to switch between ON and OFF as illustrated in FIG. 3(*d*).

Time under control in the charging mode is indicated on the horizontal axis of FIGS. 3(*c*) and 3(*d*). ON (that is, conductive) or OFF (that is, cut off) is indicated on the vertical axis of FIGS. 3(*c*) and 3(*d*).

In the charging mode, DC voltage from the DC power supply 101 through an electricity conveyance device such as a pantograph, and through the filter reactor FL, is applied to the inverter circuit 102.

Thus in association with the operation of the switching elements, the charging current Ich illustrated in FIG. 3(*e*) is output from the inverter circuit 102. The time under control in the charging mode is indicated by the horizontal axis of FIG. 3(*e*). The magnitude of the charging current Ich is indicated by the vertical axis of FIG. 3(*e*).

The switching elements operate when the gate signal GS is output of the pulse width corresponding to a time period that is longer than the minimum reaction time of the switching element. The time period of output of current through the switching element of the inverter circuit 102, as illustrated in FIG. 3(*e*), becomes longer with the passage of time under control in the charging mode.

On the other hand, the maximum values of the charging current Ich output from the inverter circuit 102 during each operation of the switching element are roughly constant, as illustrated in FIG. 3(*e*).

The reason therefor is described below. Magnitude of the charging current Ich is directly proportional to a difference between the voltage VFc of the filter condenser FC3 and the voltage Vin between the terminals of the primary coil of the transformer 103. Due to charging of the filter condenser FC3 with the passage of time under control in the charging mode, the voltage VFc of the filter condenser FC3 gradually becomes high. Thus even if the switching element were to remain turned ON after the turning of the switching element ON, the peak value of the charging current Ich would gradually become small. Each of the sinusoidal wave-like double-dot-dashed lines 111 of FIG. 3(*e*) indicates the change of the charging current Ich that flows if the switching element is assumed to remain turned ON after the turning of the switching element ON, and the straight double-dot-dashed line 112 indicates that the peak values decrease. As a result, even though the time of output of current through the switching element of the inverter circuit 102 becomes longer with the passage of time under control in the charging mode, the maximum value of the charging current Ich becomes constant.

The filter condenser FC3 is gradually charged in this manner by the current output from the inverter circuit 102. The filter condenser FC3 becomes fully charged. Upon passage of the charging time Tch, operation of the inverter controller 105 in the charging mode ends, and operation transitions to the running mode.

Further, in FIGS. 3(*a*) to 3(*e*), for ease of understanding of the characteristics of the present disclosure, the slope of the value indicated by the command signal, the change of the pulse width of the gate signal GS, and the change of the peak current are indicated to be large; although these changes actually would often be more gradual.

(Operation in Running Mode)

When operation starts in the running mode, the command outputter 107 outputs the triangular wave signal TS including the value corresponding to the elapsed time of operation under control in the running mode, and the triangular wave outputter 108 outputs the command signal CS including the value corresponding to the elapsed time of operation under control in the running mode. Here, the relationships between time under control in the running mode versus the values indicated by the each of the triangular wave signal TS and the command signal CS are illustrated FIG. 4(*a*). The time under control in the running mode is indicated by the horizontal axis of FIG. 4(*a*), and the values indicated by the triangular wave signal TS and the command signal CS are indicated by the vertical axis.

Each of the comparator 109 and the gate drive circuit 110 operates in the same manner as in the charging mode. Thus when the command signal CS is output from the command outputter 107 and the triangular wave signal TS is output from the triangular wave outputter 108, both outputted signals include the values illustrated in FIG. 4(*a*), the gate signal GS illustrated in FIG. 4(*b*) is output from the gate drive circuit 110. The time under control in the running mode is indicated by the horizontal axis of FIG. 4(*b*), and the output (High) or non-output (Low) of the gate signal GS is indicated by the vertical axis of FIG. 4(*b*).

Each of the switching elements of the inverter circuit 102, in the similar manner as under operation in the charging mode, turns ON (conductive) when the gate signal GS is input, and turns OFF (cut off) when input of the gate signal GS is cut off. Further, when the comparison result signal CRS from the comparator 109 is interrupted, in the same manner as that of operation in the charging mode, the gate drive circuit 110 changes switching element which is the output destination of the gate signal GS.

Figure 4:
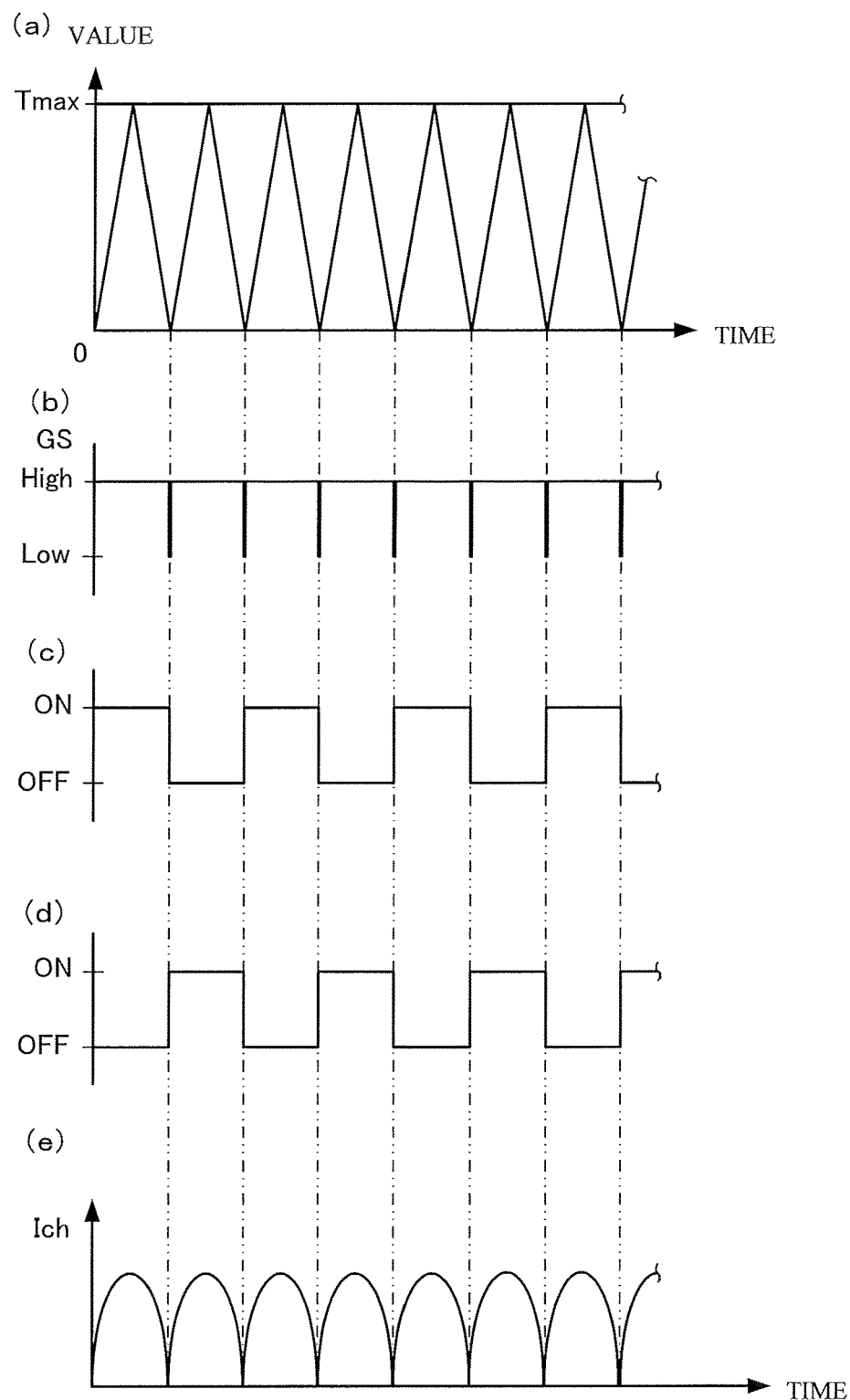
FIG. 4 is a graph for description of the gate signal output corresponding to operation of the inverter controller of Embodiment 1 of the present disclosure in a running mode.

Thus one of the switching elements of the inverter circuit 102 is operated to switch between ON and OFF as illustrated in FIG. 4(*c*). Further, the other switching element of the inverter circuit 102 is operated to switch between ON and OFF as illustrated in FIG. 4(*d*).

The horizontal axis of FIGS. 4(*c*) and (*d*) indicates the time under control in the running mode. The vertical axis of FIGS. 4(*c*) and (*d*) indicates ON (that is, conductive) or OFF (that is, cut off).

In the running mode, DC voltage from the DC power supply 101 through an electricity conveyance device such as a pantograph, and through the filter reactor FL, is applied to the inverter circuit 102. Thus the charging current Ich illustrated in FIG. 4(*e*) is output from the inverter circuit 102 in association with the operation of the switching elements. The horizontal axis of FIG. 4(*e*) indicates the time under control in the running mode. The vertical axis of FIG. 4(*e*) indicates the magnitude of the charging current Ich.

Embodiment 1 of the present disclosure is described above.

In the charging mode in the present embodiment, the inverter controller 105, in comparison to the running mode, decreases pulse width of the gate signal GS for causing operation of the switching elements. Thus the time of output of the charging current Ich from the inverter circuit 102 becomes shorter than that in the running mode, and thus, the output of the current can be cut off prior to the current flowing in the switching elements of the inverter circuit 102 becoming large. Thus the flow of high current in the switching elements of the inverter circuit 102 can be prevented during charging of the filter condenser FC3.

Further, during the time period in which the amount of stored electricity in the filter condenser FC3 is small, there is normally a high probability of a particularly high current flowing in the switching elements of the inverter circuit 102. In the charging mode, the inverter controller 105 gradually increases the pulse width of the gate signal GS causing operation of the switching elements of the inverter circuit 102. The time period of output of the charging current Ich from the inverter circuit 102 by this means becomes gradually longer in association with the increase in the amount of charge that accumulates in the filter condenser FC3. Thus the charging current Ich flowing in the switching elements of the inverter circuit 102 can be made small during the time period in which the amount of stored electricity of the filter condenser FC3 is small.

This thus enables suppression of damage to the switching elements of the inverter circuit 102 during charging of the filter condenser FC3.

Modified Example 1

As the pulse width of the gate signal GS output initially from the gate drive circuit 110 in the charging mode, at the minimum value Tmin, a value may be adopted that is between zero and the value Vmin, which is the minimum reaction time of the switching element.

By setting of the value to between zero and the value Vmin, the current output initially from the inverter circuit 102 after the start of operation of the inverter controller 105 in the charging mode, at the minimum value Tmin, can be made as close as possible to the minimum value of output of the inverter circuit 102. This configuration enables decrease of the current flowing in the switching elements at the start of charging of the filter condenser FC3, when current flow taking place in the switching elements is particularly likely to be high.

Even assuming that variance occurs in the time period of output of current from the inverter circuit 102, and that variance occurs in the pulse width of the gate signal GS, this configuration has the result of enabling suppression of flow of high current that would result in overcurrent in the switching elements of the inverter circuit 102.

Thus damage to the switching elements during charging of the filter condenser can be suppressed.

Modified Example 2

The number of elements and the form of interconnection of each of the elements included in the inverter circuit 102 and the converter circuit 104 may be varied appropriately. Thus the number of corresponding filter condensers FC1 and FC2, and the form of interconnection thereof, may be varied appropriately. The number of filter condensers FC3 also may be varied appropriately.

Modified Example 3

In Embodiment 1 an example is described in which the inverter circuit 102 includes witching elements, and the inverter controller 105 outputs the gate signal GS to cause operation of such switching elements. However, the converter circuit 104 may include, for example, switching elements and diodes connected in reverse-parallel to the switching elements. Further, the converter controller for output of the gate signal GS for causing operation of the switching elements of the converter circuit 104 may be provided with a configuration that is the same as that of the inverter controller 105 of Embodiment 1, so that the pulse width of the gate signal GS gradually becomes large in the charging mode. Thus in the same manner as in Embodiment 1, damage to the switching elements during charging of the filter condenser FC3 can be suppressed.

Modified Example 4

The inverter controller 105 may have a counter holding a count N of outputting of the gate signal GS after the start of operation. In this case, the inverter controller 105 may output a gate signal GS at a predetermined pulse interval, and having a pulse width obtained by multiplying N by a predetermined value. Due to this configuration, pulse width of the gate signal GS in the charging mode becomes smaller than that in the running mode, and this pulse width can be gradually made larger depending on the elapsed time under control in the charging mode. Thus in the same manner as in Embodiment 1, damage to the switching elements during charging of the filter condenser FC3 may be suppressed.

Modified Example 5

In Embodiment 1, an example is described in which pulse width of the gate signal GS changes during operation of the inverter controller 105 in the charging mode. Alternatively, a fixed resistance or a variable resistance may be arranged in parallel to the circuit connected to the primary coil or secondary coil of the transformer 103. Further, the inverter controller 105 may perform control that causes switching, during operation in the charging mode, for connection to a circuit that includes the fixed resistance or variable resistance, and that causes switching, during operation in the running mode, for connection to a circuit that does not include the fixed resistance or variable resistance. Thus in the same manner as in Embodiment 1, the flow of high current in the switching elements of the inverter circuit 102 during charging of the filter condenser FC3 can be suppressed. Thus in the same manner as in Embodiment 1, damage to the switching elements during charging of the filter condenser FC3 can be suppressed.

Embodiment 2

Figure 5:
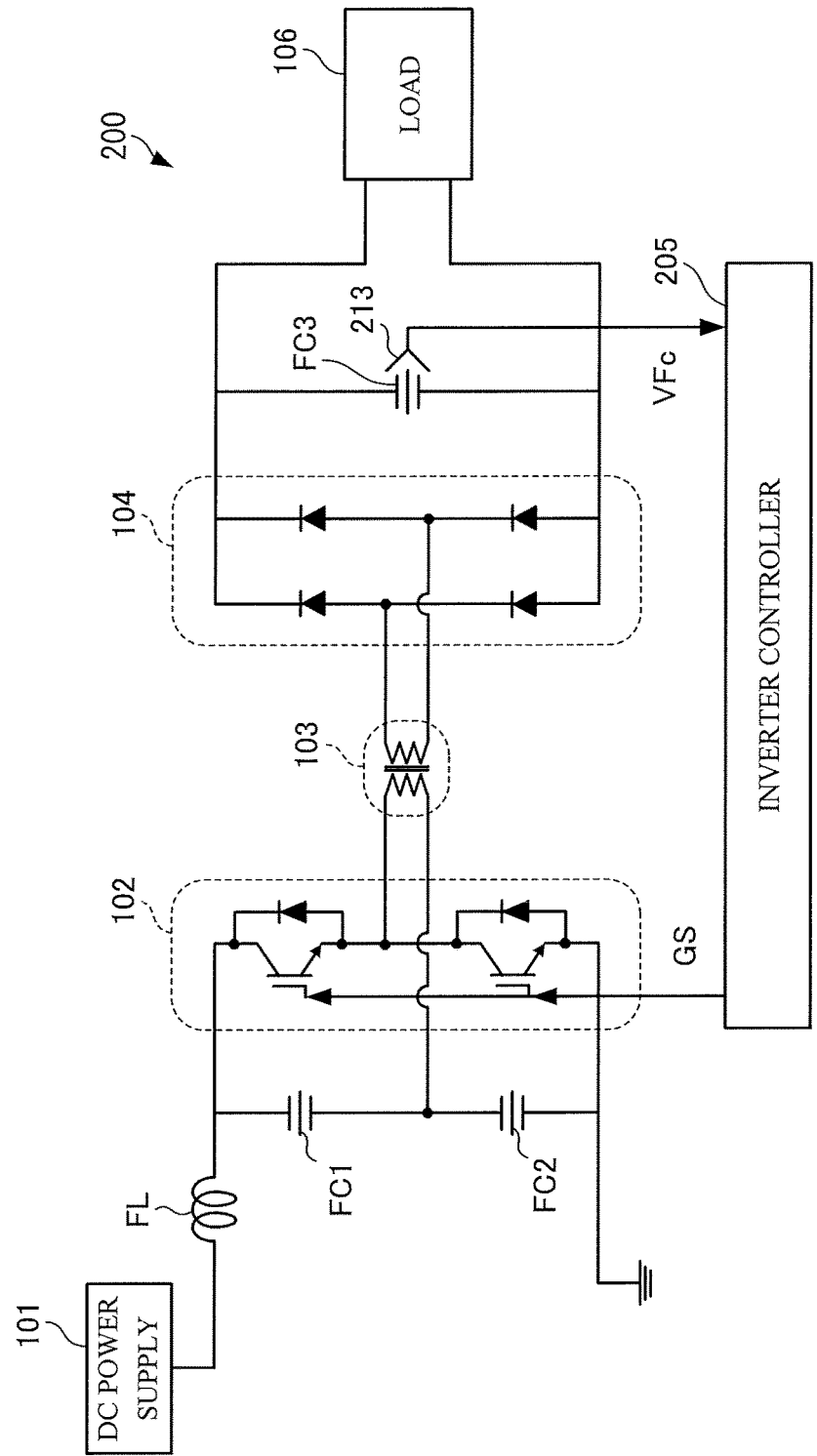
FIG. 5 is a drawing illustrating configuration of the auxiliary power supply device for electric rolling stock of Embodiment 2 of the present disclosure.

As illustrated in FIG. 5, an auxiliary power supply device 200 for electric rolling stock of Embodiment 2 of the present disclosure is equipped with an inverter controller 205 in place of the inverter controller 105 provided for the auxiliary power supply device 100 of Embodiment 1. Further, the auxiliary power supply device 200 is equipped with a voltage sensor 213 for measuring voltage VFc of the filter condenser FC3 (between the electrodes) and for outputting to the inverter controller 205 a voltage signal indicating the results of the measurement.

In the charging mode, the inverter controller 205 lengthens the pulse interval of the gate signal GS to a pulse interval that is longer than that in the running mode.

Figure 6:
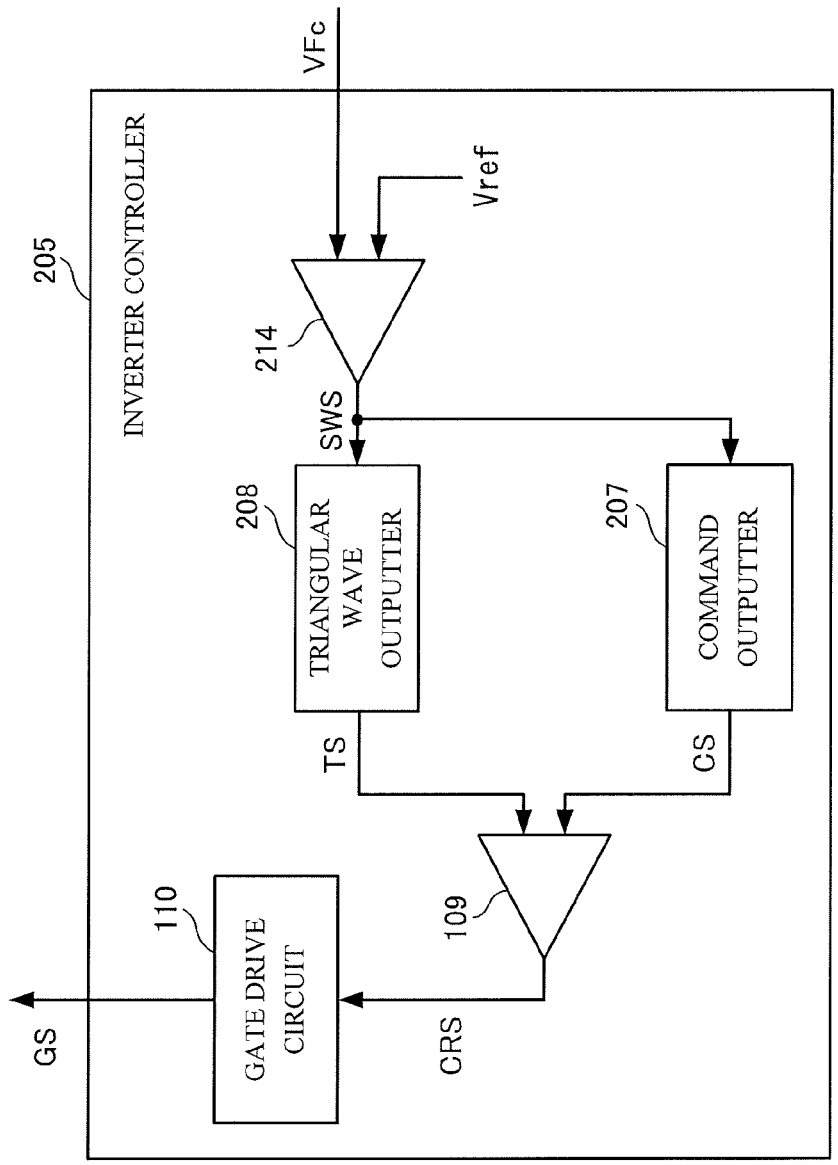
FIG. 6 is a drawing illustrating configuration of the inverter controller of Embodiment 2.

In particular as illustrated in FIG. 6, the inverter controller 205 includes a command outputter 207 and a triangular wave outputter 208 in place of the command outputter 107 and triangular wave outputter 108 provided for the inverter controller 105 of Embodiment 1. The inverter controller 205 further includes a switching signal outputter 214 for comparing the voltage VFc of the filter condenser FC3 with a predetermined reference voltage Vref, and for outputting a switching signal SWS for switching, on the basis of results of the comparison, operation mode of the command outputter 207 and the triangular wave outputter 208 between the charging mode and the running mode. Here, a value corresponding to the specification voltage of the filter condenser FC3, for example, may be used as the reference voltage Vref.

The switching signal outputter 214 acquires the voltage signal from the voltage sensor 213. The switching signal outputter 214 compares the reference voltage Vref and the voltage VFc indicated by the acquired voltage signal. When the voltage VFc is greater than the reference voltage Vref, the switching signal outputter 214 outputs the switching signal SWS indicating that the mode is the running mode. When the voltage VFc is less than or equal to the reference voltage Vref, the switching signal outputter 214 outputs the switching signal SWS indicating that the mode is the charging mode.

The triangular wave outputter 208, on the basis of the switching signal SWS, outputs the triangular wave signal TS on the basis of whether the mode is the charging mode or the running mode.

Figure 7:
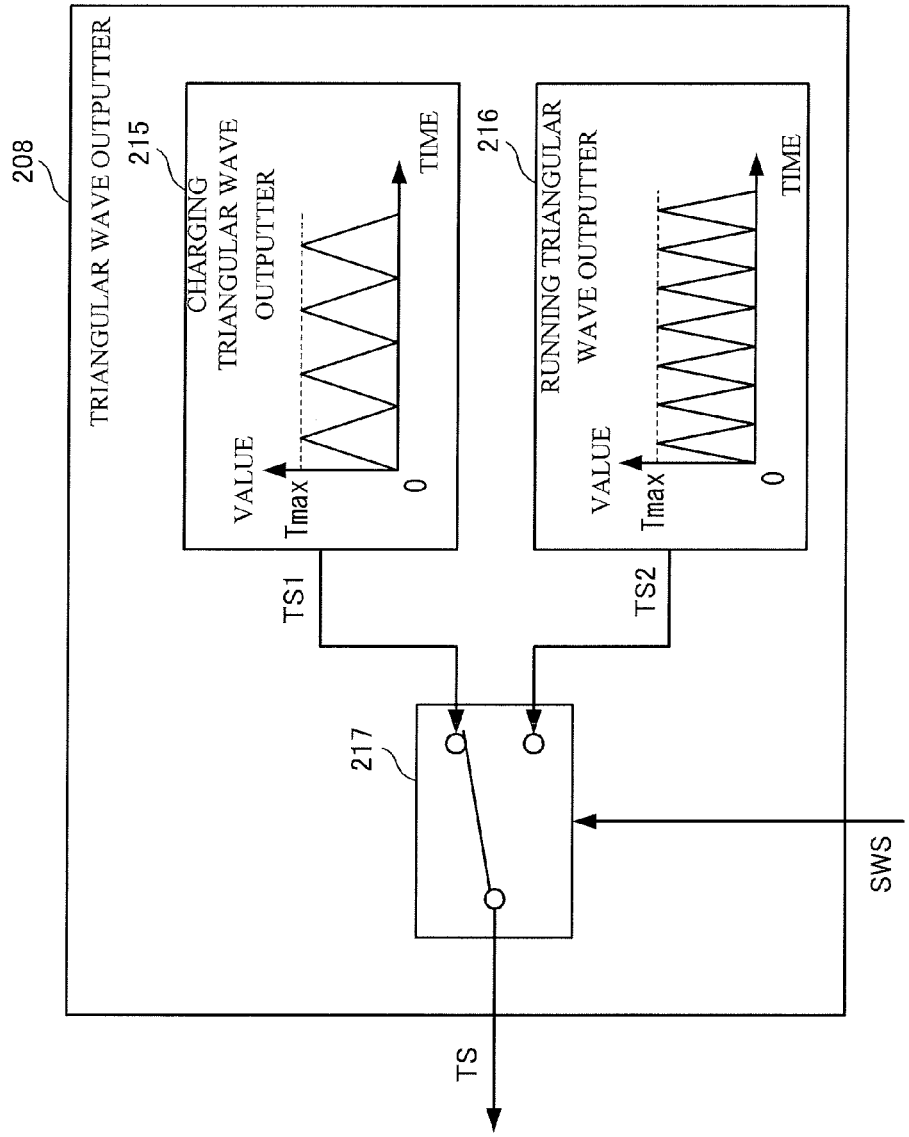
FIG. 7 is a drawing illustrating configuration of a triangular wave outputter of Embodiment 2.

In particular, as illustrated in FIG. 7, the triangular wave outputter 208 includes: a charging triangular wave outputter 215 to output a triangular wave signal TS1 indicating a value in accordance with a predetermined charging triangular wave (first triangular wave) in the charging mode, a running triangular wave outputter 216 for outputting a triangular wave signal TS2 indicating a value in accordance with a predetermined running triangular wave (second triangular wave) in the running mode, and a triangular wave switcher 217 for switching, on the basis of the switching signal SWS, the triangular wave signal TS output from the triangular wave outputter 208 as either the triangular wave signal TS1 or the triangular wave signal TS2.

The charging triangular wave outputter 215 is holds beforehand a charging triangular wave information indicating a relationship between a value and the elapsed time after the start of operation of the inverter controller 205, and outputs the triangular wave signal TS1 in accordance with the charging triangular wave information. In particular, charging triangular wave outputter 215, using the charging triangular wave information held by the charging triangular wave outputter 215 itself, specifies a value corresponding to the elapsed time after the start of operation of the inverter controller 205. Then the charging triangular wave outputter 215 outputs the triangular wave signal TS1 that includes the specified value.

The running triangular wave outputter 216 holds beforehand running triangular wave information indicating a relationship between a value and the elapsed time after start of operation of the inverter controller 205, and outputs the triangular wave signal TS2 in accordance with the running triangular wave information. In particular, the running triangular wave outputter 216, using the running triangular wave information held by the running triangular wave outputter 216 itself, specifies the value corresponding to the elapsed time after the start of operation of the inverter controller 205. Then the running triangular wave outputter 216 outputs the triangular wave signal TS2 that includes the specified value.

As illustrated in FIG. 7, each of the charging triangular wave information and the running triangular wave information indicates a triangular wave that repeatedly increases and decreases in value depending on the elapsed time after the start of operation of the inverter controller 205. As illustrated in the figure, period of the charging triangular wave is longer than the period of the running triangular wave signal.

The triangular wave switcher 217 acquires the switching signal SWS from the switching signal outputter 214. When the switching signal SWS indicates that the mode is the charging mode, the triangular wave switcher 217 sets the triangular wave signal TS output from the triangular wave outputter 208 to the triangular wave signal TS1 output from the charging triangular wave outputter 215. When the switching signal SWS indicates that the mode is the running mode, the triangular wave switcher 217 sets the triangular wave signal TS output from the triangular wave outputter 208 to the triangular wave signal TS2 output from the running triangular wave outputter 216.

The command outputter 207 outputs, on the basis of the switching signal SWS, the command signal CS that corresponds to whether the operation mode is the charging mode or the running mode.

Figure 8:
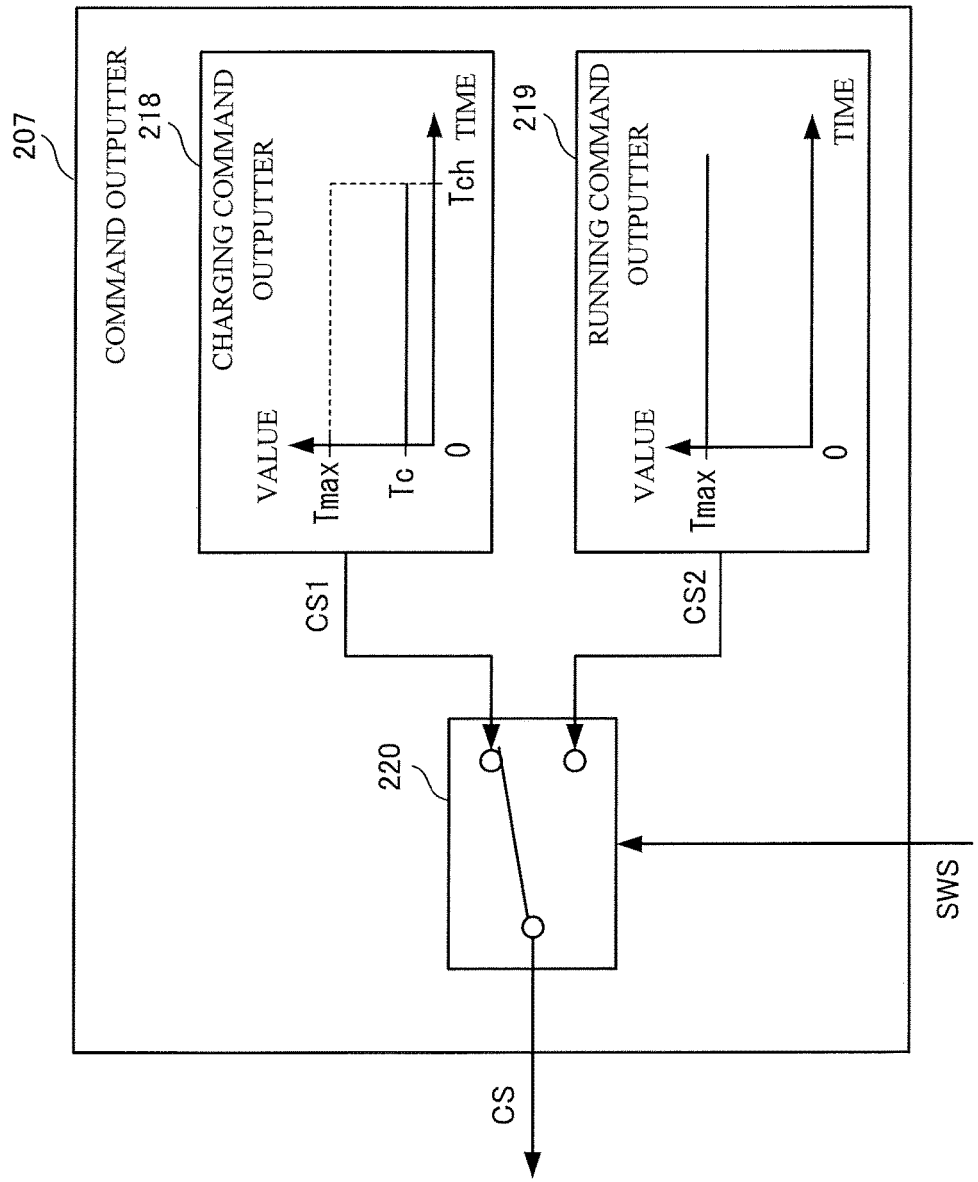
FIG. 8 is a drawing illustrating configuration of a command outputter of Embodiment 2.

In particular, as illustrated in FIG. 8, the command outputter 207 includes: a charging command outputter 218 for output of a command signal CS1 indicating a predetermined value Tc when in the charging mode; a running command outputter 219 for output of a command signal CS2 indicating a predetermined value (maximum value Tmax in the same manner as in Embodiment 1) when in the running mode; and a command switcher 220 for switching the command signal CS output from the command outputter 207, on the basis of the switching signal SWS, to either a command signal TS1 or a command signal TS2.

The charging command outputter 218 holds beforehand charging command information indicating the predetermined value Tc, and outputs the command signal CS1 in accordance with the charging command information. In particular, the charging command outputter 218 outputs the command signal CS1, which includes the value Tc indicated by the charging command information held by the charging command outputter 218.

The running command outputter 219 holds beforehand running command information indicating the predetermined value Tmax, and outputs the command signal CS2 in accordance with the running command information. In particular, the running command outputter 219 outputs the command signal CS2, which includes the value Tmax indicating the running command information held by the running command outputter 219.

As illustrated in FIG. 7, the value Tc indicated by the charging command information is smaller than the value Tmax indicated by the running command information.

The command switcher 220 acquires the switching signal SWS from the switching signal outputter 214. When the switching signal SWS indicates that the mode is the charging mode, the command switcher 220 sets the command signal CS output from the command outputter 207 to the command signal CS1 output from the charging command outputter 218. When the switching signal SWS indicates that the mode is the running mode, the command switcher 220 sets the command signal CS output from the command outputter 207 to the command signal CS2 from the running command outputter 219.

The configuration of the auxiliary power supply device 200 of Embodiment 2 is described above. Operation of the auxiliary power supply device 200 is described below.

(Operation in Charging Mode)

In the charging mode, the triangular wave outputter 208, as the triangular wave signal TS, outputs the triangular wave signal TS1 output from the charging triangular wave outputter 215. Moreover, the command outputter 207, as the command signal CS, outputs the command signal CS1 output from the charging command outputter 218.

The comparator 109 and the gate drive circuit 110 operate in the same manner as in Embodiment 1. Thus in the charging mode, the gate signal GS is output from the gate drive circuit 110 in the time period during which the value indicated by the triangular wave signal TS1 is less than the value Tc indicated by the command signal CS1.

(Operation in Running Mode)

In the running mode, the triangular wave outputter 208, as the triangular wave signal TS, outputs the triangular wave signal TS2 output from the running triangular wave outputter 216. Moreover, the command outputter 207, as the command signal CS, outputs the command signal CS2 output from the running command outputter 219.

The comparator 109 and the gate drive circuit 110 operate in the same manner as in Embodiment 1. Thus in the running mode, the gate signal GS is output from the gate drive circuit 110 in the time period during which the value indicated by the triangular wave signal TS2 is less than the value Tmax indicated by the command signal CS2.

Due to such operation, the pulse interval of the gate signal GS output from the inverter controller 205 is longer in the charging mode than when in the running mode.

Generally, the output of current from the inverter circuit 102 stops at a point in time that is different from the point in time when the current becomes zero due to resonance in the resonance-type inverter circuit 102, and the switching elements generate heat due to losses that occur in association with switching operation.

In the present embodiment, the inverter controller 205 prolongs the pulse interval of the gate signal GS in the charging mode relative to when in the running mode. Thus even though heat is generated by the switching elements due to the losses that occur in association with switching operation, the switching elements can undergo the next switching operation after a certain degree of cooling of the switching elements. Such operation enables the prevention of excess heating of the switching elements of the inverter circuit 102 during charging of the filter condenser FC3. Thus suppression is possible of damage due to excessive heat held by the switching elements of the inverter circuit 102 during charging of the filter condenser FC3.

Embodiment 3

Figure 9:
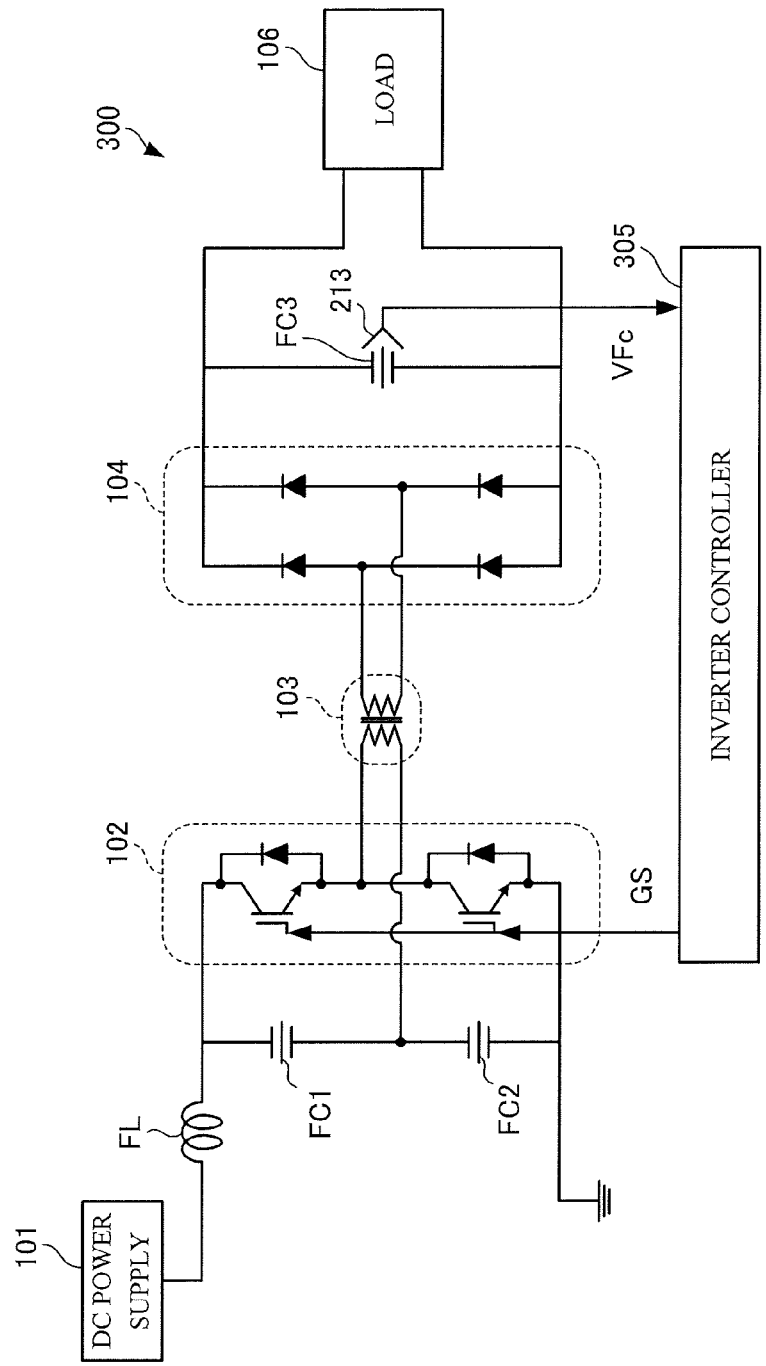
FIG. 9 is a drawing illustrating configuration of the auxiliary power supply device for electric rolling stock of Embodiment 3 of the present disclosure.

As illustrated in FIG. 9, the auxiliary power supply device 300 for electric rolling stock of Embodiment 3 of the present disclosure includes an inverter controller 305 in place of the inverter controller 205 of the auxiliary power supply device 200 of Embodiment 2.

The inverter controller 305 decreases pulse width of the gate signal GS in the charging mode in comparison that when in the running mode, makes the pulse width of the gate signal GS gradually larger depending on the elapsed time under control in the charging mode, and prolongs the pulse interval of the gate signal GS relative to that in the running mode.

Figure 10:
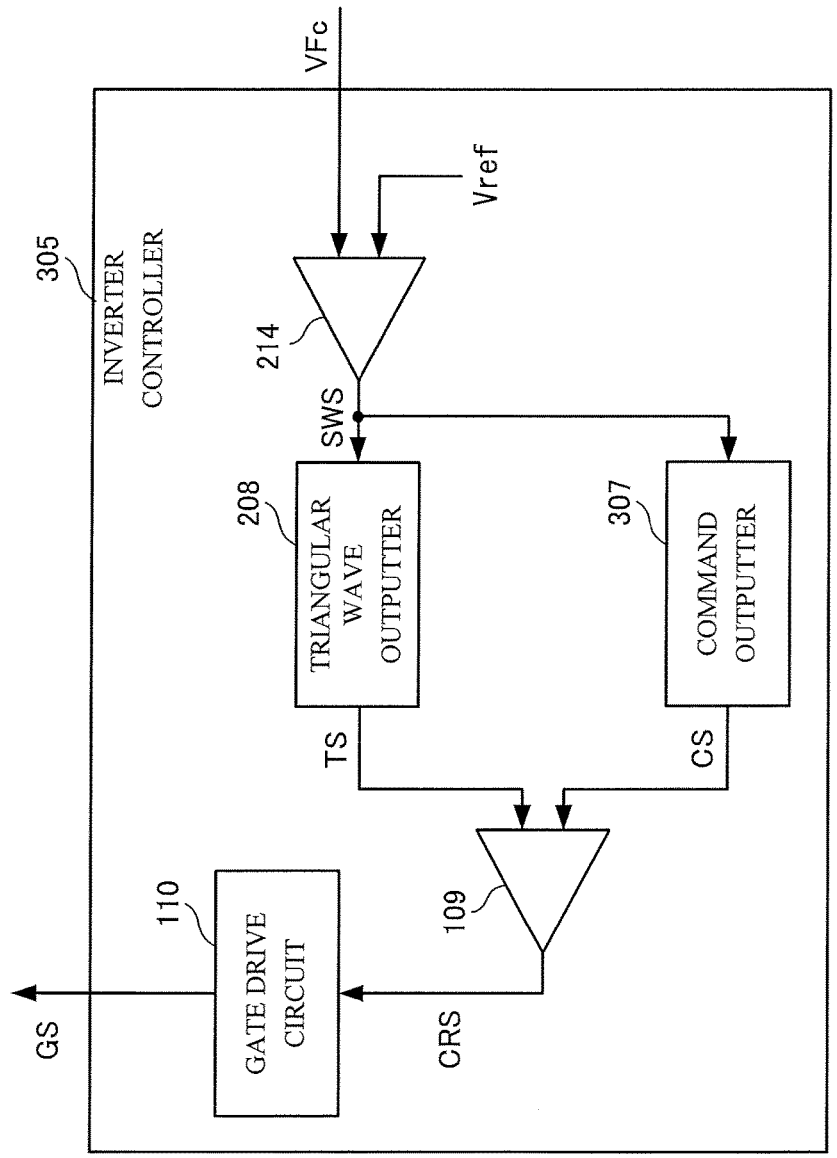
FIG. 10 is a drawing illustrating configuration of the inverter controller of Embodiment 3.

In particular, as illustrated in FIG. 10, the inverter controller 305 includes a command outputter 307 in place of the command outputter 207 provided for the inverter controller 205 of Embodiment 2.

In the same manner as the command outputter 207 of Embodiment 2, the command outputter 307 outputs, on the basis of the switching signal SWS, the command signal CS in accordance with whether the operation mode is the charging mode or running mode. The command signal CS output in the charging mode in the present embodiment differs from that of Embodiment 2.

Figure 11:
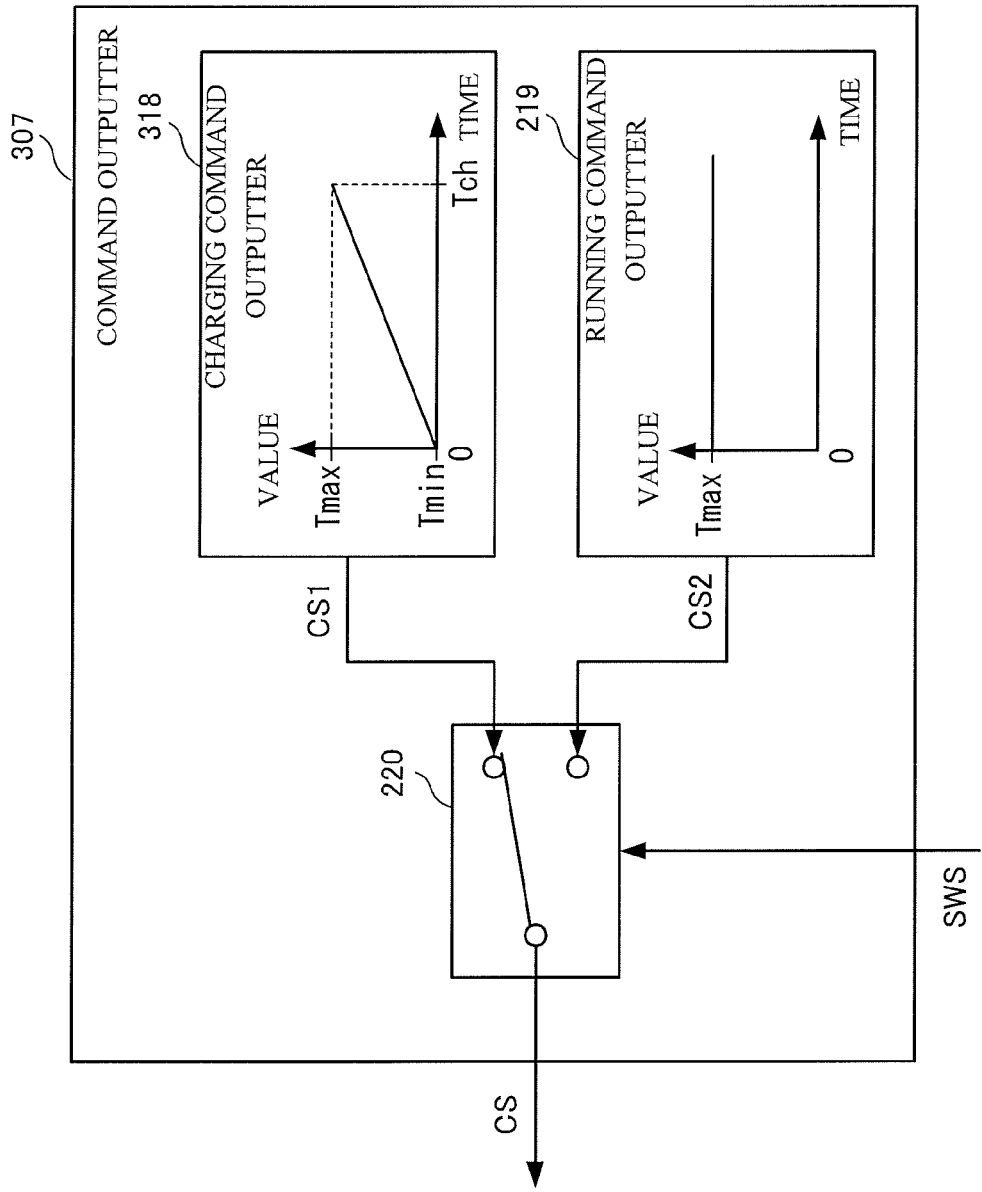
FIG. 11 is a drawing illustrating configuration of the command outputter of Embodiment 3.

In particular, as illustrated in FIG. 11, the command outputter 307 includes a charging command outputter 318 in place of the charging command outputter 218 provided for the command outputter 207 of Embodiment 2.

The charging command outputter 318 holds beforehand charging command information indicating a relationship between a value and the elapsed time after the start of operation of the inverter controller 305, and outputs the command signal CS1 in accordance with the charging command information.

As illustrated in FIG. 11, the charging command information of the present embodiment indicates a ramp function. That is to say, the charging command information of the present embodiment indicates a value that increases linearly from the minimum value Tmin to the maximum value Tmax during a time period from the start of operation of the inverter controller 305 until the charging time Tch. The minimum value Tmin may be determined appropriately in the same manner as in Embodiment 1, and for example, may be zero.

Configuration of the auxiliary power supply device 300 of Embodiment 3 is described above.

The auxiliary power supply device 300 of the present embodiment operates in the same manner as the auxiliary power supply device 200 of Embodiment 2. Thus in the charging mode, in contrast to the command signal CS of Embodiment 2, the command signal CS output from the command outputter 307 indicates a value that gradually increases depending on the elapsed time under control in the charging mode.

Due to operation in this manner, pulse width of the gate signal GS output from the inverter controller 305 in the charging mode, in the same manner as Embodiment 1, is smaller than the pulse width in the running mode, and the pulse width of the gate signal GS gradually becomes large depending on the elapsed time under control in the charging mode. Further, the pulse interval of the gate signal GS output from the inverter controller 305 in the charging mode, in the same manner as in Embodiment 2, is longer than that of the running mode.

In the same manner as Embodiment 1, the present embodiment can prevent the flow of a high current in the switching elements of the inverter circuit 102 during charging of the filter condenser FC3. Further, during the time period in which the amount of stored electricity of the filter condenser FC3 is small, the charging current Ich flowing in the switching elements of the inverter circuit 102 can be made small.

Further, in the same manner as Embodiment 2, excess heating of the switching elements of the inverter circuit 102* can be prevented during charging of the filter condenser FC3.

Thus damage of the switching elements of the inverter circuit 102 during charging of the filter condenser FC3 can be suppressed.

Embodiment 4

Figure 12:
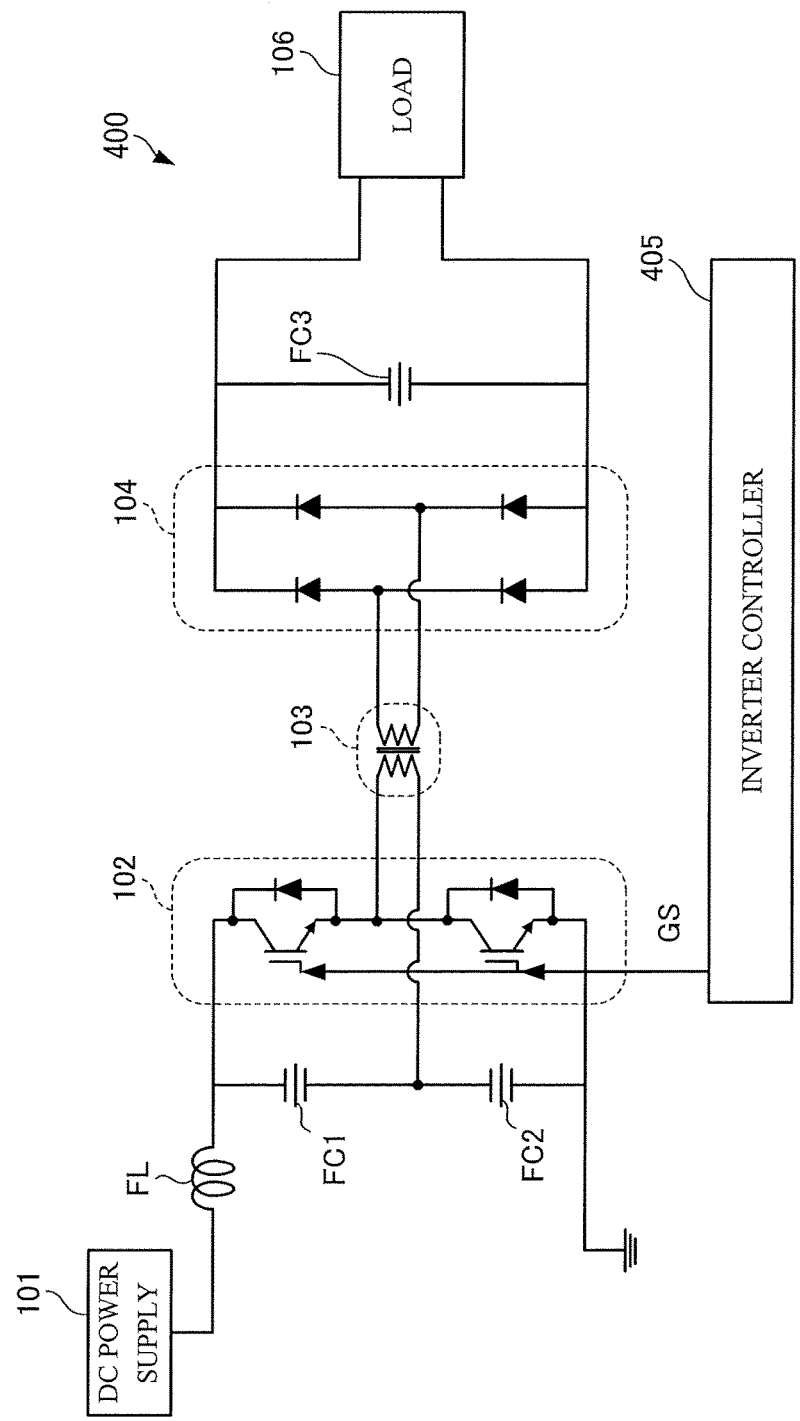
FIG. 12 is a drawing illustrating configuration of the auxiliary power supply device for electric rolling stock of Embodiment 4 of the present disclosure.

As illustrated in FIG. 12, the auxiliary power supply device 400 for electric rolling stock of Embodiment 4 of the present disclosure includes an inverter controller 405 in place of the inverter controller 105 provided for the auxiliary power supply device 100 of Embodiment 1.

The inverter controller 405, in the same manner as the inverter controller 305 of Embodiment 3, decreases pulse width of the gate signal GS in the charging mode relative to that in the running mode, makes the pulse width of the gate signal GS gradually larger depending on the elapsed time under control in the charging mode, and prolongs the pulse interval of the gate signal GS relative to that in the running mode. Further, the inverter controller 405 gradually shortens the pulse interval depending on the elapsed time under control in the charging mode.

Figure 13:
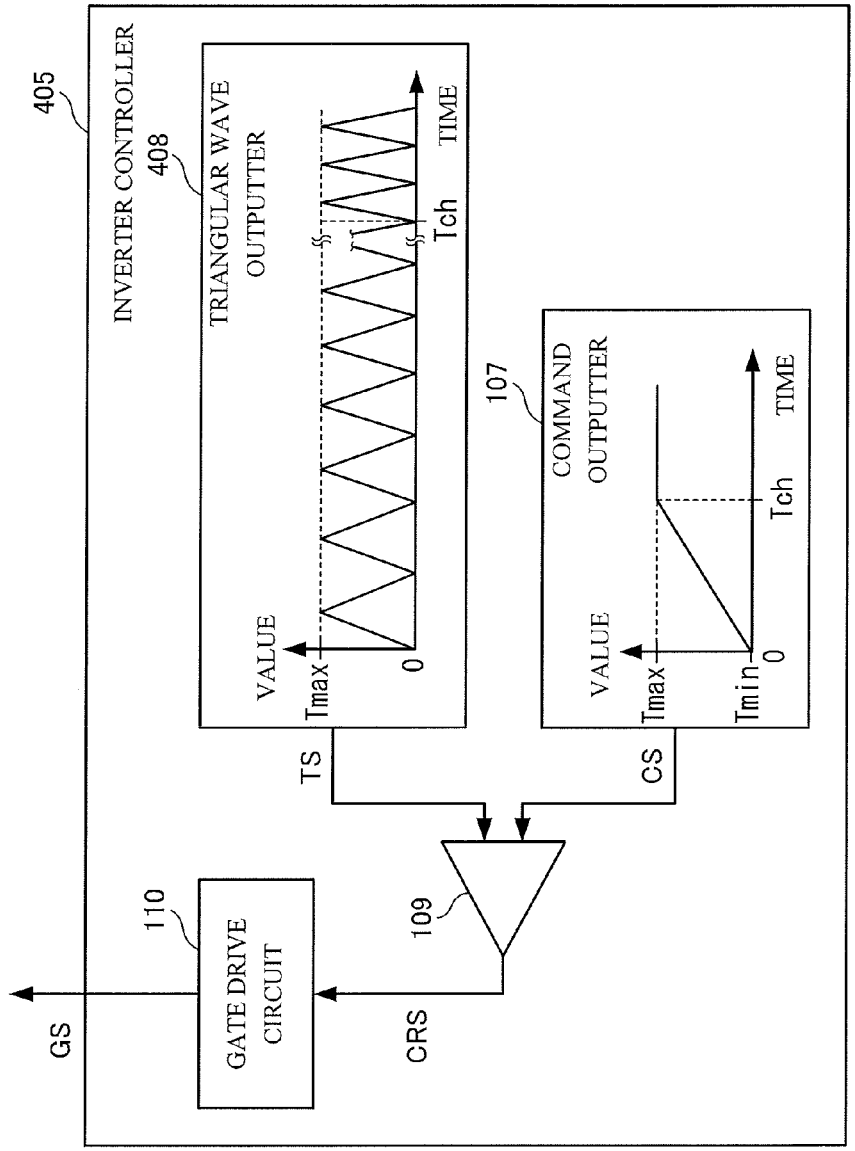
FIG. 13 is a drawing illustrating configuration of the inverter controller of Embodiment 4.

In particular, as illustrated in FIG. 13, the inverter controller 405 includes a triangular wave outputter 408 in place of the triangular wave outputter 108 provided for the inverter controller 105 of Embodiment 1.

The triangular wave outputter 408, in the same manner as the triangular wave outputter 108 of Embodiment 1, holds beforehand triangular wave information that indicates the relationship between a value and elapsed time after the start of operation of the inverter controller 405, and the triangular wave outputter 408 outputs the triangular wave signal TS corresponding to the triangular wave information. Then the triangular wave outputter 408, using the triangular wave information held by the triangular wave outputter 408, specifies the value corresponding to the elapsed time after the start of operation of the inverter controller 405. Then the triangular wave outputter 408 outputs the triangular wave signal TS that includes the specified value.

The triangular wave information of the present embodiment is the same as the triangular wave information of Embodiment 1 in that the triangular wave information indicates a triangular wave. As illustrated in FIG. 13, the triangular wave information of the present embodiment differs from the triangular wave information of Embodiment 1 in that the period gradually shortens from the start of operation of the inverter controller 405 until the charging time Tch, that is to say, during operation of the inverter controller 405 in the charging mode.

Further, for the triangular wave indicated by the triangular wave information of the present embodiment, the period during the time of operation of the inverter controller 405 in the charging mode is longer than the period in the running mode having exceeded the charging time Tch after the start of operation of the inverter controller 405.

The configuration of the auxiliary power supply device 400 of Embodiment 4 is described above.

The auxiliary power supply device 400 of the present embodiment operates in the same manner as the auxiliary power supply device 100 of Embodiment 1. Thus in the charging mode, in contrast to the triangular wave signal TS of Embodiment 1, the triangular wave signal TS output from the triangular wave outputter 408 has a period that becomes gradually shorter with the elapsing of time under control in the charging mode.

Due to operation in this manner, the pulse width of the gate signal GS output from the inverter controller 405 in the charging mode, in the same manner as in Embodiment 1, is smaller than that in the running mode, and the pulse width gradually increases depending on the elapsed time under control in the charging mode. Further, the pulse interval of the gate signal GS output from the inverter controller 405 in the charging mode, in the same manner as in Embodiment 2, is longer than that of the running mode. Further, the pulse interval of the gate signal GS output from the inverter controller 405 in the charging mode becomes gradually shorter depending on the elapsed time under control in the charging mode.

In the same manner as Embodiment 1, the present embodiment enables the prevention of the flow of a high current in the switching elements of the inverter circuit 102 during charging of the filter condenser FC3. Further, the charging current Ich flowing in the switching elements of the inverter circuit 102 can be made small during the time period in which the amount of stored electricity of the filter condenser FC3 is small.

Further, in the same manner as in Embodiment 2, excess heating can be prevented in the switching elements of the inverter circuit 102 during charging of the filter condenser FC3.

Thus damage to the switching elements of the inverter circuit 102 during charging of the filter condenser FC3 can be suppressed.

Further, the pulse interval of the gate signal GS becomes gradually shorter in the present embodiment depending on the elapsed time under control in the charging mode, and thus the time period required for charging of the filter condenser FC3 can be shortened in comparison to Embodiment 3.

Embodiment 5

Figure 14:
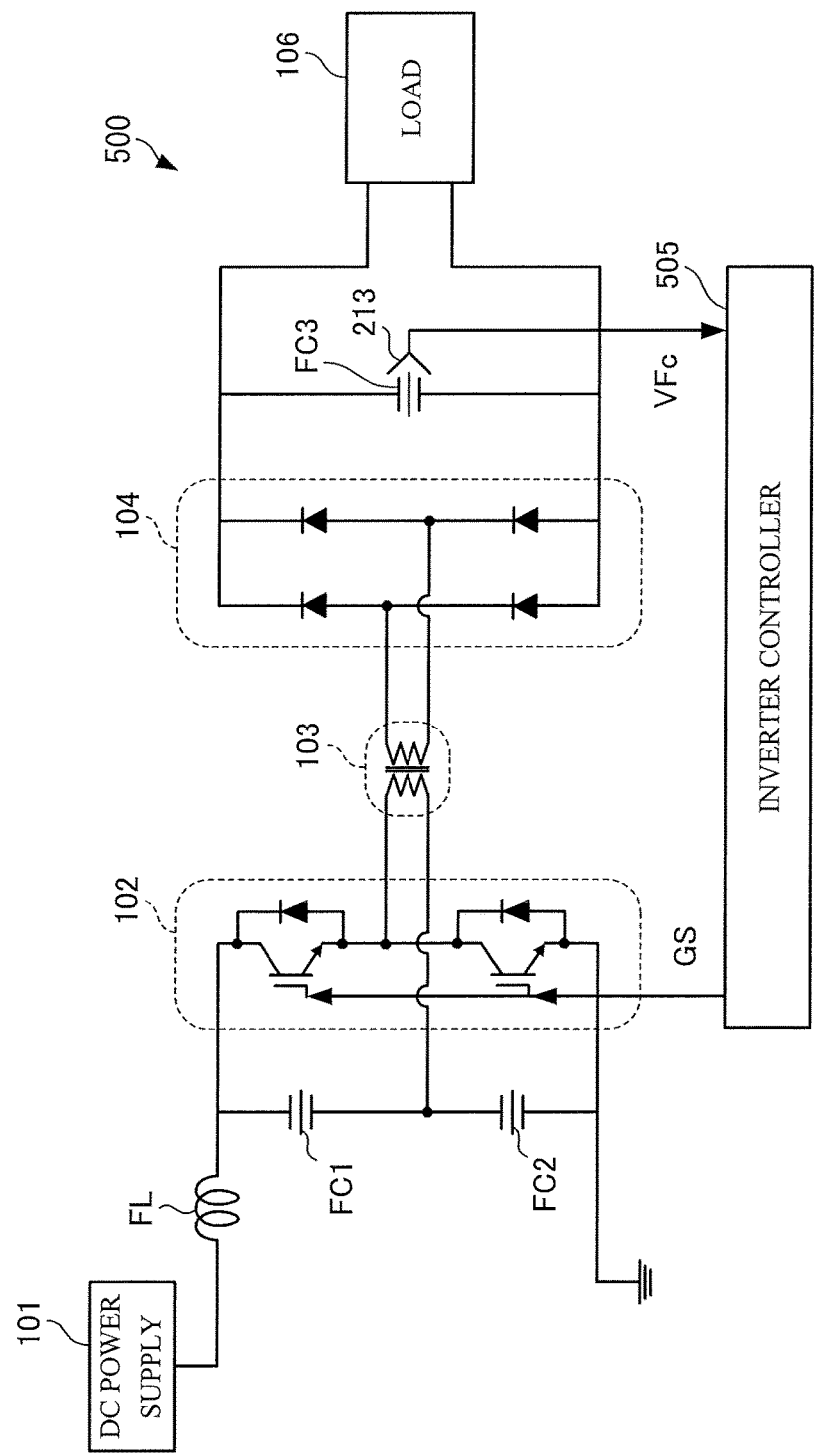
FIG. 14 is a drawing illustrating configuration of the auxiliary power supply device for electric rolling stock of Embodiment 5 of the present disclosure.

As illustrated in FIG. 14, the auxiliary power supply device 500 for electric rolling stock of the present embodiment includes an inverter controller 505 in place of the inverter controller 205 provided for the auxiliary power supply device 200 of Embodiment 2.

The inverter controller 505 outputs the gate signal GS in the same manner as the inverter controller 405 of Embodiment 4.

Figure 15:
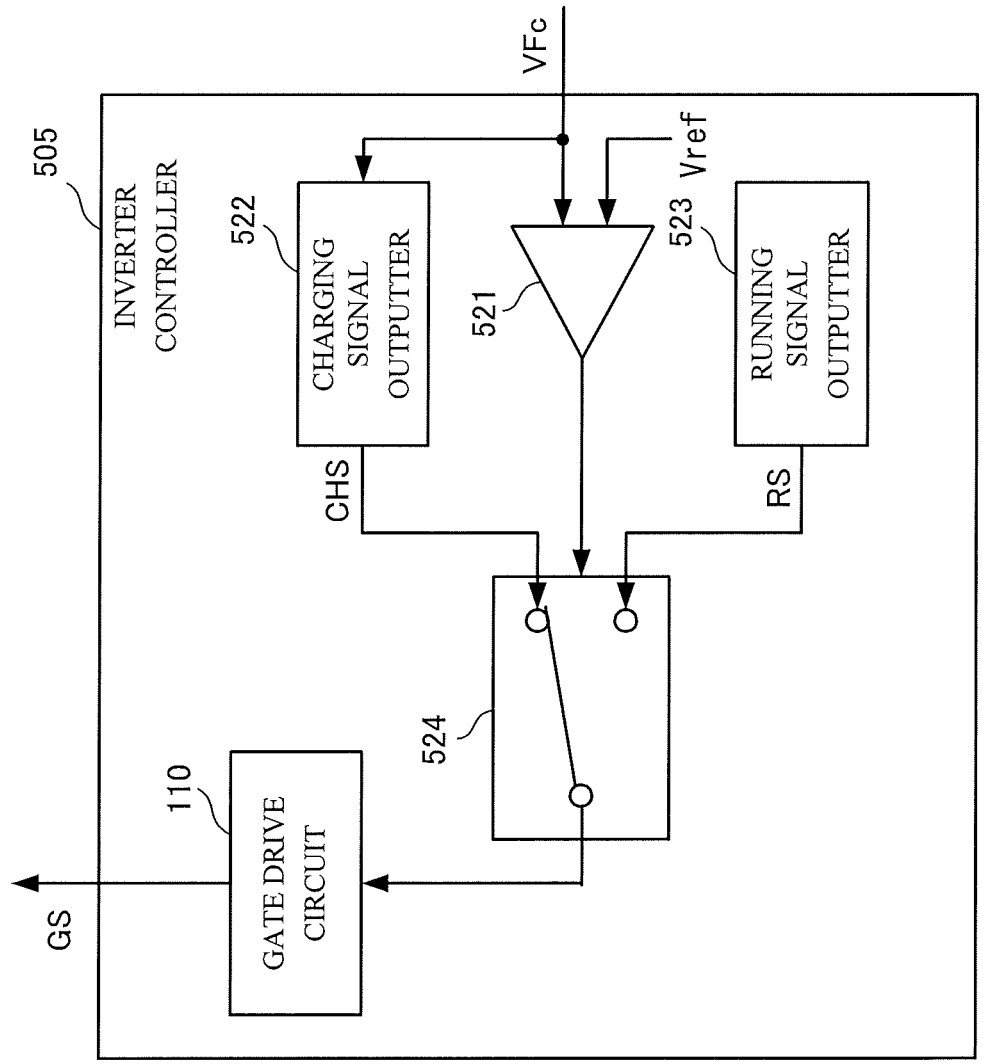
FIG. 15 is a drawing illustrating configuration of the inverter controller of Embodiment 5.

In particular, as illustrated in FIG. 15, the inverter controller 505 includes: a voltage comparator 521 for comparing a reference voltage Vref with the voltage VFc of the filter condenser FC3 indicated by the voltage signal, and outputting a signal indicating the results of the comparison; a charging signal outputter 522 for outputting the charging signal CHS when in the charging mode; a running signal outputter 523 for outputting the running signal RS when in the running mode; an output signal switcher 524 for, on the basis of the signal output from the voltage comparator 521, switching an output signal as either the charging signal or the running signal; and a gate drive circuit 110, in the same manner as Embodiment 1, for outputting a gate signal on the basis of the signal output from the output signal switcher 524.

The voltage comparator 521 acquires the voltage signal from the voltage sensor 213. The voltage comparator 521 compares the voltage VFc indicated by the acquired voltage signal and the reference voltage Vref. If the voltage VFc is larger than the reference voltage Vref, the voltage comparator 521 outputs a signal indicated that the mode is the running mode. If the voltage VFc is less than or equal to the reference voltage Vref, the voltage comparator 521 outputs a signal indicated that the mode is the charging mode.

When the signal output from the voltage comparator 521 indicates that the mode is the charging mode, the output signal switcher 524 outputs the charging signal CHS output from the charging signal outputter 522. When the signal output from the voltage comparator 521 indicates that the mode is the running mode, the output signal switcher 524 outputs the running signal RS output from the running signal outputter 523.

The charging signal outputter 522 acquires the voltage signal from the voltage sensor 213, and determines, on the basis of the voltage VFc indicated by the acquired voltage signal, the pulse width and frequency of the gate signal GS. The charging signal outputter 522 generates and outputs the charging signal CHS, which includes the determined frequency and pulse width.

Figure 16:
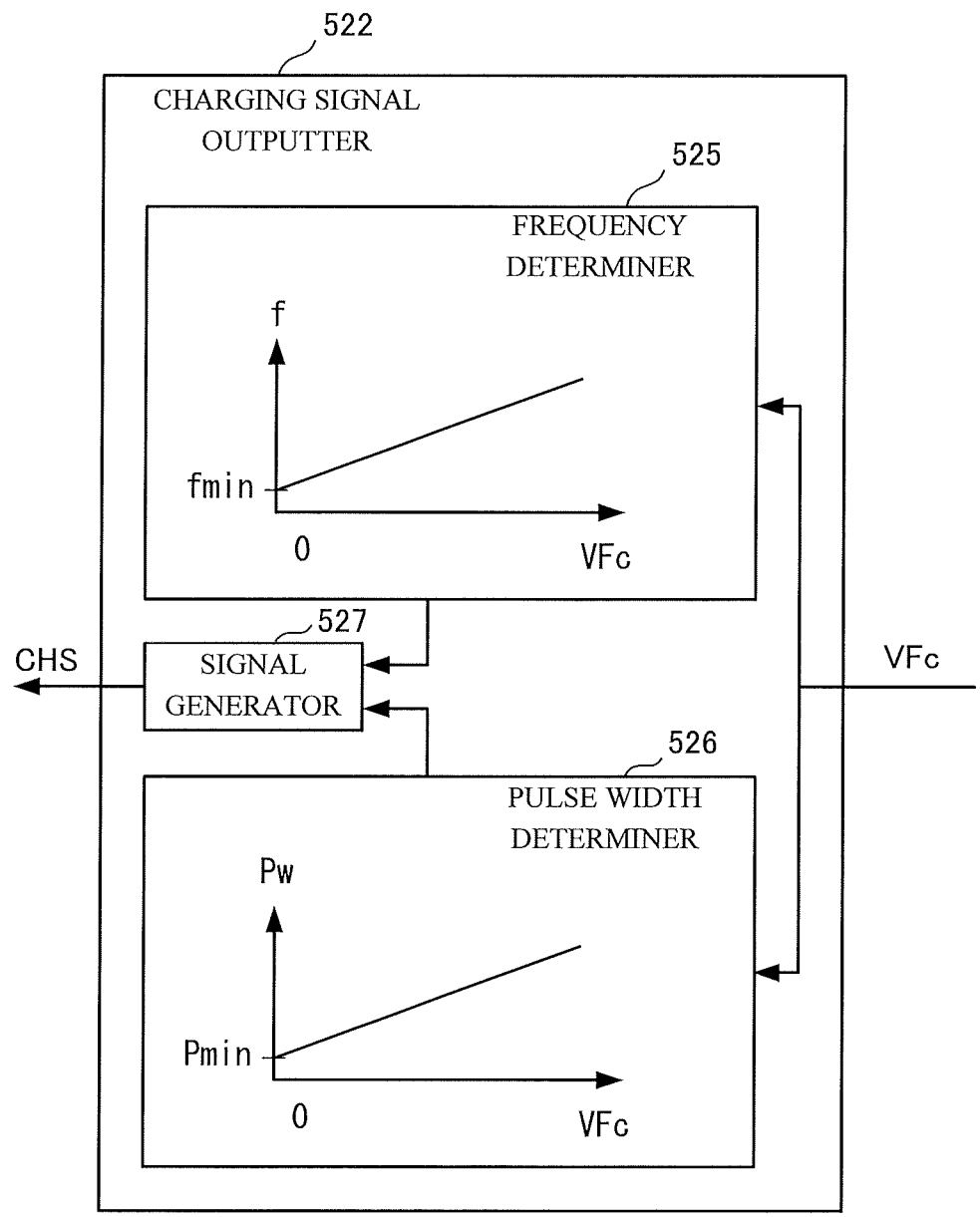
FIG. 16 is a drawing illustrating configuration of a charging signal outputter of Embodiment 5.

In particular, as illustrated in FIG. 16, the charging signal outputter 522 includes: a frequency determiner 525 for determining frequency of the gate signal GS on the basis of the voltage VFc; a pulse width determiner 526 for determination of the pulse width of the gate signal GS on the basis of the voltage VFc; and a signal generator 527 for generating and outputting of the charging signal CHS that includes the frequency determined by the frequency determiner 525 and the pulse width determined by the pulse width determiner 526.

As illustrated in FIG. 16, the frequency determiner 525 holds information that determines a relationship by which, in accordance with increase of the voltage VFc, frequency f becomes gradually larger (for example, linearly) from a predetermined minimum value fmin. The frequency determiner 525 acquires the voltage signal from the voltage sensor 213. By referencing the information held by the frequency determiner 525, the frequency determiner 525 determines a frequency corresponding to the voltage VFc indicated by the acquired voltage signal.

As illustrated in FIG. 16, the pulse width determiner 526 holds information that determines a relationship such that the pulse width Pw becomes gradually larger (for example, linearly) from a predetermined minimum value Pmin in accordance with increase of the voltage VFc. The pulse width determiner 526 acquires the voltage signal from the voltage sensor 213. By referencing the information held by the pulse width determiner 526, the pulse width determiner 526 determines the pulse width that corresponds to the voltage VFc indicated by the acquired voltage signal.

Figure 17:
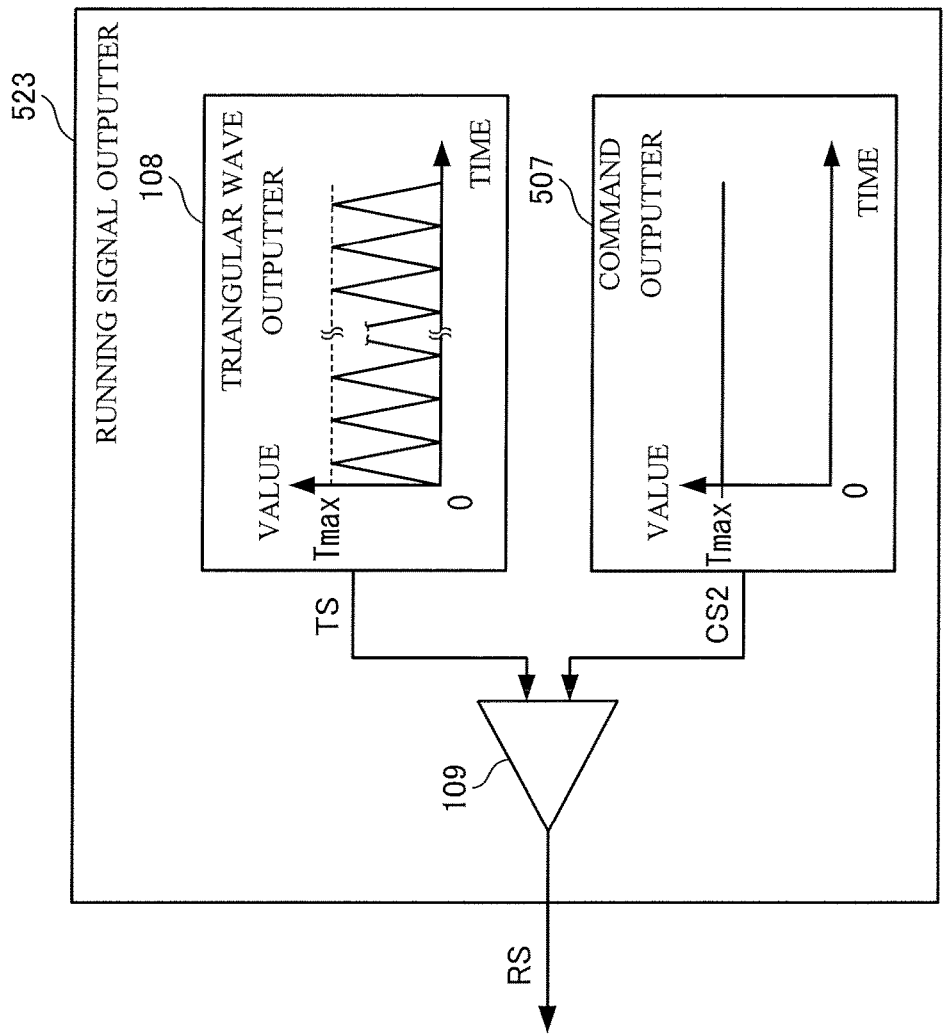
FIG. 17 is a drawing illustrating configuration of a running signal outputter of Embodiment 5.

The running signal outputter 523 outputs the running signal RS in the same manner as the comparison result signal CRS output by the comparator 109 in the running mode in Embodiment 2. In particular, as illustrated in FIG. 17, the running signal outputter 523 includes: a comparator 109 and a triangle wave outputter 108 in the same manner as Embodiment 1; and a command outputter 507 in the same manner as the running command outputter 219 of Embodiment 2.

Due to operation of the inverter controller 505 provided with this type of configuration, the inverter controller 505 outputs a gate signal GS similar to that of the inverter controller 405 of Embodiment 4. Thus the present embodiment has effects similar to those of Embodiment 4.

Modified Example 6

The functions exhibited by the inverter controllers 105, 205, 305, 405 and 505 of each of the embodiments can be realized by the inverter controllers 105, 205, 305, 405 and 505 executing a software program. Further, by patterning and determining each of the pulse widths of the gate signal GS, a gate signal GS can be output similarly to the gate signal GS output by the inverter controllers 105, 205, 305, 405 and 505 of each of the embodiments. An effect similar to that of each of the embodiments is attained by this type of method.

Although the foregoing describes embodiments and modified examples, the present invention is not limited to these embodiments and modified examples. The present invention includes appropriate combinations of the embodiments and modified examples, and includes embodiments and modified examples with appropriately added modifications.

REFERENCE SIGNS LIST 100, 200, 300, 400, 500 Auxiliary power supply device for electric rolling stock
101 DC power supply
102 Inverter circuit
103 Transformer
104 Converter circuit
105, 205, 305, 405, 505 Inverter controller
107, 207, 307, 507 Command outputter
108, 208, 408 Triangular wave outputter
109 Comparator
110 Gate drive circuit
213 Voltage sensor
214 Switching signal outputter
215 Charging triangular wave outputter
216 Running triangular wave outputter
217 Triangular wave switcher
218, 318 Charging command outputter
219 Running command outputter
220 Command switcher
521 Voltage comparator
522 Charging signal outputter
523 Running signal outputter
524 Output signal switcher
525 Frequency determiner
526 Pulse width determiner
527 Signal generator

The invention claimed is:

1. An auxiliary power supply device for electric rolling stock, comprising:
a resonance-type inverter circuit to convert a DC power input from a DC power supply to a AC power;
a transformer comprising a primary coil to input the AC power from the inverter circuit and a secondary coil, insulated from the primary coil, to output a AC power;
a converter circuit to convert the AC power output from the transformer to a DC power;

a filter condenser to smooth a DC voltage output from the converter circuit; and a controller to output a gate signal to operate a switching element of the inverter circuit or the converter circuit, wherein the controller comprises a command outputter to, in a charging mode, output a first command signal indicating a value that becomes gradually larger depending on an elapsed time under control in the charging mode, and to, in a running mode, output a second command signal indicating a fixed value, and sets a pulse width of the gate signal under the charging mode to be smaller than under the running mode, and gradually increases the pulse width with an elapsed time under control in the charging mode, the charging mode being for control of charging of the filter condenser, the running mode being for control of running of the electric rolling stock.

2. The auxiliary power supply device for electric rolling stock according to claim 1, wherein the controller comprises:

a triangular wave outputter to, in the charging mode, output a first triangular wave signal indicating a value depending on a predetermined first triangular wave; and a gate drive circuit to output the gate signal in a time period during which the value indicated by the first triangular wave signal is smaller than the value indicated by the first command signal.

3. The auxiliary power supply device for electric rolling stock according to claim 2, wherein, for the value indicated by the first command signal when the charging mode starts, the pulse width of the gate signal output initially, in the charging mode, from the gate drive circuit is between zero and a minimum reaction time of the switching element.

4. The auxiliary power supply device for electric rolling stock according to claim 1, wherein the controller sets a pulse interval of the gate signal longer in the charging mode than in the running mode.

5. The auxiliary power supply device for electric rolling stock according to claim 4, wherein the controller comprises:

a triangular wave outputter to, in the charging mode, output a first triangular wave signal indicating a value in accordance with a predetermined first triangular wave, and to, in the running mode, output a second triangular wave signal indicating a value in accordance with a predetermined second triangular wave, and a gate drive circuit to, in the charging mode, output the gate signal during a time period when the value indicated by the first triangular wave signal is less than the value indicated by the first command signal, and to, in the running mode, output the gate signal during a time period when the value indicated by the second triangular wave signal is less than the value indicated by the second command signal, wherein a period of the first triangular wave is longer than a period of the second triangular wave.

6. The auxiliary power supply device for electric rolling stock according to claim 5, wherein the period of the second triangular wave is equal to a period of resonance of the resonance-type inverter circuit.

7. The auxiliary power supply device for electric rolling stock according to claim 4, wherein the controller gradually shortens the pulse interval depending on the elapsed time under control in the charging mode.

8. An auxiliary power supply device for electric rolling stock, comprising:

a resonance-type inverter circuit to convert a DC power input from a DC power supply to a AC power;

a transformer to convert a voltage of the AC power output from the inverter circuit;

a converter circuit to convert a AC power output from the transformer to a DC power;

a filter condenser to smooth a DC voltage output from the converter circuit; and a controller to output a gate signal to operate a switching element of the inverter circuit or the converter circuit, wherein the controller comprises a command outputter to, in a charging mode, output a first command signal indicating a value that becomes gradually larger depending on an elapsed time under control in the charging mode, and to, in a running mode, output a second command signal indicating a fixed value, and is further to make a pulse interval of the gate signal longer under the charging mode for control of charging of the filter condenser than under the running mode for control of running of the electric rolling stock.

9. The auxiliary power supply device for electric rolling stock according to claim 8, wherein the controller comprises:

a triangular wave outputter to, in the charging mode, output a first triangular wave signal indicating a value in accordance with a predetermined first triangular wave, and to, in the running mode, output a second triangular wave signal indicating a value in accordance with a predetermined second triangular wave; and a gate drive circuit to, in the charging mode, output the gate signal during a time period when the value indicated by the first triangular wave signal is less than the value indicated by the command signal, and to, in the running mode, output the gate signal during a time period when the value indicated by the second triangular wave signal is less than the value indicated by the command signal, and a period of the first triangular wave signal is longer than a period of the second triangular.

* * * * *